US008426020B2

(12) United States Patent
Schmid et al.

(10) Patent No.: US 8,426,020 B2
(45) Date of Patent: Apr. 23, 2013

(54) D1381 SUPERCOATINGS FOR OPTICAL FIBER

(75) Inventors: Steven R. Schmid, East Dundee, IL (US); Petrus Jacobus Hubertus Niels, Zwolle (NL); Paulus Antonius Maria Steeman, Spaubeek (NL); Xiaosong Wu, Charlotte, NC (US); Wendell Wayne Cattron, Iron Station, NC (US); Tyson Dean Norlin, South Elgin, IL (US); Edward J. Murphy, Arlington Heights, IL (US); John M. Zimmerman, Crystal Lake, IL (US); Anthony Joseph Tortorello, Elmhurst, IL (US)

(73) Assignee: DSM IP Assets B.V., Heerlen (NL)

( * ) Notice: Subject to any disclaimer, the term of this patent is extended or adjusted under 35 U.S.C. 154(b) by 341 days.

(21) Appl. No.: 11/955,541

(22) Filed: Dec. 13, 2007

(65) Prior Publication Data

US 2008/0226909 A1    Sep. 18, 2008

Related U.S. Application Data

(60) Provisional application No. 60/874,731, filed on Dec. 14, 2006, provisional application No. 60/874,719, filed on Dec. 14, 2006, provisional application No. 60/874,722, filed on Dec. 14, 2006, provisional application No. 60/874,721, filed on Dec. 14, 2006, provisional application No. 60/874,723, filed on Dec. 14, 2006, provisional application No. 60/874,720, filed on Dec. 14, 2006, provisional application No. 60/874,730, filed on Dec. 14, 2006, provisional application No. 60/974,631, filed on Sep. 24, 2007.

(51) Int. Cl.
    *C08F 2/50*   (2006.01)
    *B05D 5/06*   (2006.01)
    *D02G 3/00*   (2006.01)
    *G02B 6/00*   (2006.01)

(52) U.S. Cl.
    USPC ............... 428/383; 522/96; 522/12; 428/375; 428/380; 385/144; 385/145

(58) Field of Classification Search .................. 428/378; 385/114, 145; 528/65, 66; 522/64, 174, 522/179, 96, 107, 75, 83, 173
    See application file for complete search history.

(56) References Cited

U.S. PATENT DOCUMENTS

| | | | |
|---|---|---|---|
| 4,707,076 A | 11/1987 | Skutnik et al. | |
| 4,720,529 A | 1/1988 | Kimura et al. | |
| 4,849,462 A | 7/1989 | Bishop | |
| 4,875,758 A | 10/1989 | Masuda et al. | |
| 4,900,126 A | 2/1990 | Jackson et al. | |
| 4,904,051 A | 2/1990 | Broer et al. | |
| 4,962,992 A | 10/1990 | Chapin et al. | |
| 5,104,433 A | 4/1992 | Chapin et al. | |
| 5,146,531 A | 9/1992 | Shustack | |
| 5,182,784 A | 1/1993 | Hager et al. | |
| 5,219,896 A | 6/1993 | Coady et al. | |
| 5,268,984 A | 12/1993 | Hosoya et al. | |
| 5,352,712 A | 10/1994 | Shustack | |
| 5,366,527 A | 11/1994 | Amos et al. | |
| 5,408,564 A | 4/1995 | Mills | |
| 5,416,880 A | 5/1995 | Edwards et al. | |
| 5,536,529 A | 7/1996 | Shustack | |
| 5,554,785 A | 9/1996 | Trapasso et al. | |
| 5,616,630 A | 4/1997 | Heinze | |
| 5,639,846 A | 6/1997 | Shustack | |
| 5,664,041 A | 9/1997 | Szum | |
| 5,696,179 A | 12/1997 | Chawla | |

(Continued)

FOREIGN PATENT DOCUMENTS

| | | | |
|---|---|---|---|
| CN | 1409734 A | 4/2003 | |
| CN | 1200053 C | 5/2005 | |

(Continued)

OTHER PUBLICATIONS

W. Podkoscielny and B. Tarasiuk. UV-Cured Polyurethane-Acrylic Compositions As Hard External Layers of Two-Layer Protective Coatings for Optical Fibers, *Polimery*, vol. 41, No. 7-8, pp. 448-455 (1996) (with translation).
M. Koshiba et al. Properties of Ultra-Violet Curable Polyurethane Acrylates, *Journal of Materials Science 17*, pp. 1447-1458 (1982).
D. Gloge. Optical-Fiber Packaging and Its Influence on Fiber Straightness and Loss, *The Bell aystem Technical Journal*, vol. 54, No. 2 pp. 245-262 (Feb. 1975).
W. B. Gardner. Microbending Loss in Optical Fibers, *The Bell System Technical Journal*, vol. 54, No. 2, pp. 457-465 (Feb. 1975).
T. Yabuta. Structural Analysis of Jacketed Optical Fibers Under Lateral Pressure, *J. Lightwave Tech.*, vol. LT-1, No. 4, pp. 529-535 (1983).
Lee L. Blyler, Jr. And Charles J. Aloisio. Polymer Coatings for Optical Fibers, *Chemtech*, pp. 680-684 (Nov. 1987).
J. Baldauf et al. Relationship of Mechanical Characteristics of Dual Coated Single Mode Optical Fibers and Microbending Loss, *IEICE Trans. Commun.*, vol. E76-B, No. 4, pp. 352-357 (Apr. 1993).
K. Kobayashi et al. Study of Microbending Loss in Thin Coated Fibers and Fiber Ribbons, *International Wire & Cable Symposium (IWCS) Proceedings 1993*, pp. 386-392.

(Continued)

*Primary Examiner* — Jennifer Chriss
*Assistant Examiner* — Ricardo E Lopez
(74) *Attorney, Agent, or Firm* — Nixon & Vanderhye P.C

(57) ABSTRACT

The invention provides an optical fiber coated with a Supercoating, wherein the Supercoating comprises at least two layers, wherein the first layer is a Primary Coating that is in contact with the outer surface of the optical fiber and the second layer is a Secondary Coating in contact with the outer surface of the Primary Coating, wherein the cured Primary Coating on the optical fiber has the following properties after initial cure and after one month aging at 85° C. and 85% relative humidity: A) a % RAU of from about 84% to about 99%;
B) an in-situ modulus of between about 0.15 MPa and about 0.60 MPa; and
C) a Tube Tg, of from about −25° C. to about −55° C.; wherein the cured Secondary Coating on the optical fiber has the following properties after initial cure and after one month aging at 85° C. and 85% relative humidity: A) a % RAU of from about 80% to about 98%;
B) an in-situ modulus of between about 0.60 GPa and about 1.90 GPa; and
C) a Tube Tg, of from about 50° C. to about 80° C.

2 Claims, No Drawings

U.S. PATENT DOCUMENTS

| | | | |
|---|---|---|---|
| 5,847,021 A | 12/1998 | Tortorello et al. | |
| 5,881,194 A | 3/1999 | Duecker | |
| 5,908,874 A | 6/1999 | Fong et al. | |
| 6,014,488 A | 1/2000 | Shustack | |
| 6,023,547 A | 2/2000 | Tortorello | |
| 6,042,943 A | 3/2000 | Levy | |
| 6,057,034 A | 5/2000 | Yamazaki et al. | |
| 6,110,593 A | 8/2000 | Szum et al. | |
| 6,122,428 A | 9/2000 | Duecker | |
| 6,130,980 A | 10/2000 | Murphy et al. | |
| 6,173,102 B1 | 1/2001 | Suzuki et al. | |
| 6,187,835 B1 | 2/2001 | Szum et al. | |
| 6,197,422 B1 | 3/2001 | Murphy et al. | |
| 6,298,189 B1 | 10/2001 | Szum et al. | |
| 6,323,255 B1* | 11/2001 | Snowwhite | 522/120 |
| 6,339,666 B2 | 1/2002 | Szum et al. | |
| 6,355,599 B1 | 3/2002 | Zahora et al. | |
| 6,438,306 B1 | 8/2002 | Bishop et al. | |
| 6,534,618 B1 | 3/2003 | Jacobs et al. | |
| 6,584,263 B2 | 6/2003 | Fewkes et al. | |
| 6,630,242 B1 | 10/2003 | Lin et al. | |
| 6,638,616 B2 | 10/2003 | Tortorello et al. | |
| 6,707,977 B2 | 3/2004 | Chien et al. | |
| 6,714,712 B2 | 3/2004 | Bishop et al. | |
| 6,775,451 B1 | 8/2004 | Botelho et al. | |
| 6,852,770 B2 | 2/2005 | Bishop et al. | |
| 6,862,392 B2 | 3/2005 | Fabian et al. | |
| 6,961,508 B2 | 11/2005 | van Eekelen et al. | |
| 6,961,598 B2 | 11/2005 | Diab | |
| 7,064,154 B2* | 6/2006 | Hu et al. | 522/111 |
| 7,122,247 B2 | 10/2006 | Jibing et al. | |
| 7,135,229 B2 | 11/2006 | Tortorello et al. | |
| 7,171,103 B2 | 1/2007 | Eekelen et al. | |
| 7,238,386 B2 | 7/2007 | Workman, II et al. | |
| 7,268,172 B2 | 9/2007 | Bach et al. | |
| 7,276,543 B2 | 10/2007 | Bishop et al. | |
| 2001/0025062 A1 | 9/2001 | Szum et al. | |
| 2002/0057881 A1 | 5/2002 | Greer, IV | |
| 2002/0127400 A1 | 9/2002 | Uchida et al. | |
| 2002/0146225 A1 | 10/2002 | Bulters et al. | |
| 2002/0151615 A1 | 10/2002 | Tortorello et al. | |
| 2002/0168164 A1 | 11/2002 | Bishop et al. | |
| 2003/0100627 A1 | 5/2003 | Bishop et al. | |
| 2003/0144371 A1 | 7/2003 | Kometani et al. | |
| 2004/0024080 A1 | 2/2004 | Jibing et al. | |
| 2004/0048946 A1 | 3/2004 | Tortorello et al. | |
| 2004/0062501 A1 | 4/2004 | Abel et al. | |
| 2004/0086248 A1* | 5/2004 | Wilson et al. | 385/128 |
| 2004/0162385 A1 | 8/2004 | Krebs | |
| 2004/0209994 A1 | 10/2004 | Terwillegar | |
| 2006/0052571 A1 | 3/2006 | Heischkel et al. | |
| 2006/0062539 A1* | 3/2006 | Bulters et al. | 385/142 |
| 2006/0084713 A1 | 4/2006 | Bach et al. | |
| 2006/0084756 A1 | 4/2006 | Southwell et al. | |
| 2006/0287408 A1 | 12/2006 | Baikerikar et al. | |
| 2007/0244270 A1* | 10/2007 | December et al. | 525/528 |

FOREIGN PATENT DOCUMENTS

| | | |
|---|---|---|
| CN | 1651533 A | 8/2005 |
| CN | 1770011 A | 5/2006 |
| DE | 04 12 68 60 A1 | 2/1993 |
| EP | 0 407 004 | 4/1990 |
| EP | 0 539 030 B1 | 4/1993 |
| EP | 0 619 275 B1 | 10/1994 |
| EP | 0 874 012 | 4/1998 |
| EP | 1 408 017 | 4/2004 |
| EP | 1 647 585 | 4/2006 |
| EP | 1 708 017 | 1/2007 |
| EP | 2 091 883 B1 | 8/2009 |
| EP | 1 908 786 B1 | 9/2010 |
| JP | 57-092552 | 6/1982 |
| JP | 61-21180 | 5/1986 |
| JP | 63-161417 A2 | 7/1988 |
| JP | 11-11986 | 4/1989 |
| JP | 7-206977 | 8/1995 |
| JP | 09/258041 A2 | 10/1997 |
| JP | 10-212327 | 8/1998 |
| JP | 11-60991 | 3/1999 |
| JP | 11-92537 | 4/1999 |
| JP | 11-181041 | 7/1999 |
| JP | 11-279240 | 10/1999 |
| JP | 2000-072821 | 3/2000 |
| JP | 2001-226150 | 8/2001 |
| JP | 2001-524223 | 11/2001 |
| JP | 2002-504959 | 2/2002 |
| JP | 2003-506526 | 2/2003 |
| JP | 2003/511531 | 3/2003 |
| JP | 2003-95706 | 4/2003 |
| JP | 2003-96336 | 4/2003 |
| JP | 2003-131090 A2 | 5/2003 |
| JP | 2004-051905 | 2/2004 |
| JP | 2004-51905 | 2/2004 |
| JP | 2004-210879 | 7/2004 |
| JP | 2004-217823 | 8/2004 |
| JP | 2004-530163 | 9/2004 |
| JP | 2004-534132 | 11/2004 |
| JP | 2005-524094 | 8/2005 |
| JP | 2006-117934 | 5/2006 |
| JP | 2006-131911 | 5/2006 |
| JP | 2006-249263 | 9/2006 |
| JP | 3879888 | 11/2006 |
| JP | P2009-536355 | 3/2010 |
| JP | P2009-536357 | 3/2010 |
| JP | P2009-536358 | 3/2010 |
| JP | P2009-536359 | 3/2010 |
| JP | 2010-510332 | 4/2010 |
| KR | 10-2006-0115353 | 11/2006 |
| WO | WO 95/15928 | 6/1995 |
| WO | WO 96/28396 | 9/1996 |
| WO | WO 97/46380 | 12/1997 |
| WO | WO 98/21157 | 5/1998 |
| WO | WO 98/47954 | 10/1998 |
| WO | 98/50317 | 11/1998 |
| WO | 98/57902 | 12/1998 |
| WO | 99/10443 | 3/1999 |
| WO | 00/18696 | 4/2000 |
| WO | 01/27181 | 4/2001 |
| WO | WO 01/47823 | 7/2001 |
| WO | WO 01/49625 | 7/2001 |
| WO | 02/42236 | 5/2002 |
| WO | 02/42236 A2 | 5/2002 |
| WO | WO 02/098945 | 12/2002 |
| WO | 03/091178 A2 | 11/2003 |
| WO | WO 2004/031091 | 4/2004 |
| WO | 2005/026228 | 3/2005 |
| WO | 2005/026228 A1 | 3/2005 |
| WO | 2006/129580 A1 | 12/2006 |
| WO | WO 2008/076285 | 6/2008 |
| WO | WO 2008/076297 | 6/2008 |
| WO | WO 2008/076299 | 6/2008 |
| WO | WO 2008/076300 | 6/2008 |
| WO | WO 2008/076302 | 6/2008 |

OTHER PUBLICATIONS

Mark D. Soucek and Aaron H. Johnson. New Intramolecular Effect Observed for Polyesters: An Anomeric Effect, *JCT Research*, vol. 1, No. 2, pp. 111-116 (Apr. 2004).

P.A.M. Steeman et al. Mechanical Analysis of the In-Situ Primary Coating Modulus Test for Optical Fibers, Proceedings of the 52nd International Wire & Cable Symposium (IWCS)/Focus, Philadelphia, PA, Paper 41, pp. 246-251 (2003).

Paul Steeman et al. Rheological Properties of Optical Fiber Coating Resins At High Shear Rates, Proceedings of the 53$^{rd}$ International Wire & Cable Symposium (IWCS)/Focus, Philadelphia, PA, Nov. 17-20, 2003, pp. 532-536 (2004).

Fabrizio Parodi. Isocyanate-Derived Polymers, in *Comprehensive Polymer Science*, vol. 5, Chapter 23, eds. G. Eastmond, A. Ledwith, S. Russo and P. Sigwalt, Pergamon (Elsevier Sci. Publ.), Oxford, UK, pp. 387-412 (1989).

L. Thiele and R. Becker. Catalytic Mechanisms of Polyurethane Formation, *Advances in Urethane Science and Technology*, vol. 12, pp. 59-85 (1993).

Helene Olivier-Bourbigou and Lionel Magna. Ionic Liquids: Perspectives for Organic and Catalytic Reactions, *Journal of Molecular Catalysis A: Chemical*, 182-183, pp. 419-437 (2002).

Keqi Gan et al. Recent Results From Draw Tower Simulator As a Tool for New Coating Development, DSM Desotech Inc., 16 pages, believed to have been presented at the International Wire and Cable Symposium (Orlando, Florida) in Nov. 2007.
Georges Gelbard. Organic Systhesis by Catalysis With Ion-Exchange Resins, *Ind. Eng. Chem. Res.*, vol. 44, No. 23, pp. 8468-8498 (2005).
Werner J. Blank et al. Catalysis of the Isocyanate-Hydroxyl Reaction by Non-Tin Catalysts, *Progress in Organic Coatings 35*, pp. 19-29 (1998).
T. Ukachi et al. The Effect of Drawing Rate on Mechanical Properties of UV Curable Polyurethane Acrylate Coatings for Optical Fiber, International Wire & Cable Symposium Proceedings 1992, pp. 261-266.
H. Takase et al. The Effect of Curing Temperature on Curing Rate and Mechanical Properties of Polyurethane Acrylate Coatings for Optical Fiber, International Wire & Cable Symposium Proceedings 1994, pp. 72-77.
Junji Yoshizawa et al. Cure Behavior of Optical Fiber Primary Coating on Drawing Tower, International Wire & Cable Symposium Proceedings 1999, pp. 680-686.
Tetsuo Katsuta et al. In-Situ Measurement of Primary Coating Modulus on Optical Fiber by Pull-Out-Modulus Technique, Proceedings of the 49$^{th}$ International Wire & Cable Symposium, pp. 460-465 (2000).
Satoshi Kamo et al. The Effect of the Fiber Temperature During Fiber Drawing on the Properties of Primary Coatings, Proceedings of the 55$^{th}$ International Wire & Cable Symposium, Nov. 12-15, 2006, pp. 470-474.
Steven R. Schmid and Anthony F. Toussaint. Optical Fiber Coatings, *Specialty Optical Fibers Handbook*, Chapter 4, eds. Alexis Mendez and T.F. Morse, Academic Press (Elsevier), Burlington, Mass., pp. 95-122 (2007).
U.S. Appl. No. 11/955,525 (Wu et al.) filed Dec. 13, 2007.
U.S. Appl. No. 11/955,547 (Norlin et al.) filed Dec. 13, 2007.
U.S. Appl. No. 11/955,604 (Cattron et al.) filed Dec. 13, 2007.
U.S. Appl. No. 11/955,614 (Wu et al.) filed Dec. 13, 2007.
U.S. Appl. No. 11/955,628 (Wu et al.) filed Dec. 13, 2007.
U.S. Appl. No. 11/955,721 (Cattron et al.) filed Dec. 13, 2007.
U.S. Appl. No. 11/955,838 (Cattron et al.) filed Dec. 13, 2007.
U.S. Appl. No. 11/955,935 (Steeman et al.) filed Dec. 13, 2007.
International Search Report for International Application No. PCT/US2007/025427 dated Apr. 22, 2008.
Written Opinion of the International Searching Authority for International Application No. PCT/US2007/025427 dated Apr. 22, 2008.
International Search Report for International Application No. PCT/US2007/025428 dated Apr. 22, 2008.
Written Opinion of the International Searching Authority for International Application No. PCT/US2007/025428, dated Apr. 22, 2008.
International Search Report for International Application No. PCT/US2007/025479 dated Apr. 22, 2008.
Written Opinion of the International Searching Authority for International Application No. PCT/US2007/025479 dated Apr. 22, 2008.
International Search Report for International Application No. PCT/US2007/025480 dated Apr. 22, 2008.
Written Opinion of the International Searching Authority for International Application No. PCT/US2007/025480 dated Apr. 22, 2008.
International Search Report for International Application No. PCT/US2007/025481 dated Apr. 22, 2008.
Written Opinion of the International Searching Authority for International Application No. PCT/US2007/025481 dated Apr. 22, 2008.
International Search Report for International Application No. PCT/US2007/025482 dated Apr. 22, 2008.
Written Opinion of the International Searching Authority for International Application No. PCT/US2007/025482 dated Apr. 22, 2008.
International Search Report for International Application No. PCT/US2007/025485 dated Apr. 22, 2008.
Written Opinion of the International Searching Authority for International Application No. PCT/US2007/025485 dated Apr. 22, 2008.
International Search Report for International Application No. PCT/US2007/025486 dated Apr. 22, 2008.
Written Opinion of the International Searching Authority for International Application No. PCT/US2007/025486 dated Apr. 22, 2008.
W. Podkoscielny et al. Urethane-Acrylate Compositions Cured by UV Radiation As Intermediate Protective Covers of Optical Fibers. Die Angewandte Makromolekulare Chemie (Applied Macromolecular Chemistry and Physics), vol. 242, Nr. 4232, p. 123-138 (1996).
W. Podkoscielny et al. UV-Cured Polyurethane-Acrylic Compositions As Protective Coatings for Optical Waveguides. Translation submitted by J.E. Baker. International Polymer Science and Technology, vol. 21, No. 3, Shrewsbury, Shropshire, GB, p. T/102 to T/108 (1994).
Papers filed in corresponding EP application 07 862 848.4 on Dec. 2, 2010 and papers related to the prosecution of same.
CasChem, Inc. "Coscat 83" Material Safety Data Sheet—Product Identification, pp. 1-7 (1995).
Florio et al. "Handbook of Coatings Additives" 2$^{nd}$ Ed. Marcel Dekker, Inc., pp. 159-162 (2004).
Méndez et al. "Specialty Optical Fibers Handbook" pp. 95-122 (2007).
International Preliminary Report on Patentability for Int'l Appln. No. PCT/US2007/025486 mailed Jun. 16, 2009.
European Search Report for European Application No. 10193539.3 dated Mar. 3, 2011.
Office Action mailed Jul. 27, 2010 issued in U.S. Appl. No. 11/955,541.
Office Action mailed Feb. 17, 2011 issued in U.S. Appl. No. 11/955,541.
Office Action mailed Sep. 14, 2010 issued in U.S. Appl. No. 11/955,628.
Office Action mailed May 5, 2011 issued in U.S. Appl. No. 11/955,628.
Office Action mailed Aug. 11, 2010 issued in U.S. Appl. No. 11/955,525.
Office Action mailed Mar. 22, 2011 issued in U.S. Appl. No. 11/955,525.
Office Action mailed Sep. 14, 2010 issued in U.S. Appl. No. 11/955,721.
Office Action mailed Mar. 17, 2011 issued in U.S. Appl. No. 11/955,721.
Office Action mailed Aug. 31, 2010 issued in U.S. Appl. No. 11/955,604.
Office Action mailed Mar. 31, 2011 issued in U.S. Appl. No. 11/955,604.
Office Action mailed Sep. 15, 2010 issued in U.S. Appl. No. 11/955,614.
Office Action mailed Mar. 17, 2011 issued in U.S. Appl. No. 11/955,614.
Office Action mailed Sep. 27, 2010 issued in U.S. Appl. No. 11/955,547.
Office Action mailed Apr. 1, 2011 issued in U.S. Appl. No. 11/955,547.
Office Action mailed Sep. 28, 2010 issued in U.S. Appl. No. 11/955,838.
Office Action mailed Mar. 17, 2011 issued in U.S. Appl. No. 11/955,838.
Office Action mailed Sep. 28, 2010 issued in U.S. Appl. No. 11/955,935.
Office Action mailed Mar. 31, 2011 issued in U.S. Appl. No. 11/955,935.
P. 535 of Jitsuyo Plastic Yogo Jiten ("Practical Plastics Glossary"), Revised Third Edition published on Sep. 10, 1989, by Plastics Age Co., Ltd and Translation.
P. 276 of Kagaku Daijiten 9 ("Chemistry Dictionary 9"), Second Impression of First Edition published on Aug. 25, 1962. Kyoritsu Shuppan Co., Ltd and Translation.
Practical encyclopedia of plastics, material series, Industrial Research Center Production Goods Work Station, Encyclopedia Publishing Center, Jan. 22 fourth impression of the first edition, p. 807-811 and Translation.
Lyondell, Polymeg® 650 Polyol, U.S. Sales Specification, Jul. 1, 2007.
Office Action mailed Nov. 4, 2011 issued in U.S. Appl. No. 11/955,628.
Office Action mailed Oct. 17, 2011 issued in U.S. Appl. No. 11/955,525.

Office Action mailed Nov. 4, 2011 issued in U.S. Appl. No. 11/955,614.
Office Action mailed Nov. 23, 2011 issued in U.S. Appl. No. 11/955,604.
Office Action mailed Oct. 26, 2011 issued in U.S. Appl. No. 11/955,547.
Office Action mailed Oct. 14, 2011 issued in U.S. Appl. No. 11/955,541.
Office Action mailed Nov. 23, 2011 issued in U.S. Appl. No. 11/955,721.
Office Action mailed Nov. 29, 2011 issued in U.S. Appl. No. 11/955,838.
Office Action mailed Nov. 4, 2011 issued in U.S. Appl. No. 11/955,935.
Wicks, Zeno et al., "Organic Coatings: Science and Technology Volume 1: Film Formation, Components, and Appearance," 1992, pp. 198-200.
Ciba-Geigy Corp., Photoinitiators for UV Curing: A Formulator's Guide (1995) 45 pgs.
Office Action in related U.S. Appl. No. 11/955,628; Notification Date: Jun. 28, 2012.
Office Action in related U.S. Appl. No. 11/955,628; Notification Date: Jan. 22, 2013.
Office Action in related U.S. Appl. No. 11/955,525; Notification Date: May 31, 2012.
Office Action in related U.S. Appl. No. 11/955,525; Notification Date: Dec. 31, 2012.
Office Action in related U.S. Appl. No. 11/955,614; Notification Date: Jun. 28, 2012.
Office Action in related U.S. Appl. No. 11/955,614; Notification Date: Jan. 4, 2013.
Office Action in related U.S. Appl. No. 11/955,604; Notification Date: Apr. 26, 2012.
Office Action in related U.S. Appl. No. 11/955,604; Notification Date: Dec. 6, 2012.
Office Action in related U.S. Appl. No. 11/955,547; Notification Date: Jun. 28, 2012.
Office Action in related U.S. Appl. No. 11/955,547; Notification Date: Jan. 4, 2013.
Office Action in related U.S. Appl. No. 11/955,541; Notification Date: May 10, 2012.
Office Action in related U.S. Appl. No. 11/955,721; Notification Date: May 11, 2012.
Office Action in related U.S. Appl. No. 11/955,721; Notification Date: Dec. 11, 2012.
Office Action in related U.S. Appl. No. 11/955,838; Notification Date: May 18, 2012.
Office Action in related U.S. Appl. No. 11/955,838; Notification Date: Dec. 7, 2012.
Office Action in related U.S. Appl. No. 11/955,935; Notification Date: Jun. 28, 2012.
Office Action in related U.S. Appl. No. 11/955,935; Notification Date: Jan. 22, 2013.
Office Action in related U.S. Appl. No. 13/233,670; Notification Date: Apr. 25, 2012.
Office Action in related U.S. Appl. No. 13/233,670; Notification Date: Dec. 31, 2012.

* cited by examiner

D1381 SUPERCOATINGS FOR OPTICAL FIBER

CROSS-REFERENCE TO RELATED APPLICATIONS

This patent application claims priority to co-pending U.S. Provisional Patent Application No. 60/874,731, "BJ Radiation Curable Primary Coating for Optical Fiber", filed Dec. 14, 2006; co-pending U.S. Provisional Patent Application Ser. No. 60/874,719, "CR Radiation Curable Primary Coating for Optical Fiber", filed Dec. 14, 2006; co-pending U.S. Provisional Patent Application No. 60/874,722, "P Radiation Curable Primary Coating on Optical Fiber", filed Dec. 14, 2006; co-pending U.S. Provisional Patent Application No. 60/874,721, "CA Radiation Curable Primary Coating for Optical Fiber", filed Dec. 14, 2006; co-pending U.S. Provisional Patent Application No. 60/874,723, "D Radiation Curable Secondary Coating for Optical Fiber", filed Dec. 14, 2006, co-pending U.S. Provisional Patent Application No. 60/874,720, "R Radiation Curable Secondary Coating for Optical Fiber", filed Dec. 14, 2006, co-pending U.S. Provisional Patent Application No. 60/874,730, "Supercoatings for Optical Fiber", filed Dec. 14, 2006, and co-pending U.S. Provisional Patent Application No. 60/974,631, "P Radiation Curable Primary Coating on Optical Fiber", filed Sep. 24, 2007 which are all incorporated herein by reference.

FIELD OF THE INVENTION

The present invention relates to radiation curable coatings for optical fibers, optical fibers coated with said coatings and methods for the preparation of coated optical fibers.

BACKGROUND OF THE INVENTION

Optical fibers are typically coated with two or more radiation curable coatings. These coatings are typically applied to the optical fiber in liquid form, and then exposed to radiation to effect curing. The type of radiation that may be used to cure the coatings should be that which is capable of initiating the polymerization of one or more radiation curable components of such coatings. Radiation suitable for curing such coatings is well known, and includes ultraviolet light (hereinafter "UV") and electron beam ("EB"). The preferred type of radiation for curing coatings used in the preparation of coated optical fiber is UV.

The coating which directly contacts the optical fiber is called the Primary Coating, and the coating that covers the Primary Coating is called the Secondary Coating. It is known in the art of radiation curable coatings for optical fibers that Primary Coatings are advantageously sorter than Secondary Coatings. One advantage flowing from this arrangement is enhanced resistance to microbends.

Microbends are sharp but microscopic curvatures in an optical fiber involving local axial displacements of a few micrometers and spatial wavelengths of a few millimeters. Microbends can be induced by thermal stresses and/or mechanical lateral forces. When present, microbends attenuate the signal transmission capability of the coated optical fiber. Attenuation is the undesirable reduction of signal carried by the optical fiber. The relatively soft Primary Coating provides resistance to microbending of the optical fiber, thereby minimizing signal attenuation. The relatively harder Secondary Coating provides resistance to handling forces such as those encountered when the coated fiber is ribboned and/or cabled.

The article, "UV-CURED POLYURETHANE-ACRYLIC COMPOSITIONS AS HARD EXTERNAL LAYERS OF TWO-LAYER PROTECTIVE COATINGS FOR OPTICAL FIBRES", authored by W. Podkoscielny and B. Tarasiuk, Polim.Tworz.Wielk, Vol. 41, Nos. 7/8, p. 448-55, 1996, NDN-131-0123-9398-2, describes studies of the optimization of synthesis of UV-cured urethane-acrylic oligomers and their use as hard protective coatings for optical fibers. Polish-made oligoetherols, diethylene glycol, toluene diisocyanate (Izocyn T-80) and isophorone diisocyanate in addition to hydroxyethyl and hydroxypropyl methacrylates were used for the synthesis. Active diluents (butyl acrylate, 2-ethylhexyl acrylate and 1,4-butanediol acrylate or mixtures of these) and 2,2-dimethoxy-2-phenylacetophenone as a photoinitiator were added to these urethane-acrylic oligomers which had polymerization-active double bonds. The compositions were UV-irradiated in an oxygen-free atmosphere. IR spectra of the compositions were recorded, and some physical and chemical and mechanical properties (density, molecular weight, viscosity as a function of temperature, refractive index, gel content, glass transition temperature, Shore hardness, Young's modulus, tensile strength, elongation at break, heat resistance and water vapor diffusion coefficient) were determined before and after curing.

The article, "PROPERTIES OF ULTRAVIOLET CURABLE POLYURETHANE-ACRYLATES", authored by M. Koshiba; K. K. S. Hwang; S. K. Foley; D. J. Yarusso; and S. L. Cooper; published in J. Mat. Sci., 17, No. 5, May 1982, p. 1447-58; NDN-131-0063-1179-2; described a study that was made of the relationship between the chemical structure and physical properties of UV cured polyurethane-acrylates based on isophorone diisocyanate and TDI. The two systems were prepared with varying soft segment molecular weight and cross linking agent content. Dynamic mechanical test results showed that one- or two-phase materials might be obtained, depending on soft segment molecular weight. As the latter increased, the polyol Tg shifted to lower temperatures. Increasing using either N-vinyl pyrrolidone (NVP) or polyethylene glycol diacrylate (PECDA) caused an increase in Young's modulus and ultimate tensile strength. NVP cross linking increased toughness in the two-phase materials and shifted the high temperature Tg peak to higher temperatures, but PEGDA did not have these effects. Tensile properties of the two systems were generally similar.

Typically in the manufacture of radiation curable coatings for use on Optical Fiber, isocyanates are used to make urethane oligomers. In many references, including U.S. Pat. No. 7,135,229, "RADIATION-CURABLE COATING COMPOSITION", Issued Nov. 14, 2006, assigned to DSM IP Assets B.V., column 7, lines 10-32 the following teaching is provided to guide the person of ordinary skill in the art how to synthesize urethane oligomer: Polyisocyanates suitable for use in making compositions of the present invention can be aliphatic, cycloaliphatic or aromatic and include diisocyanates, such as 2,4-toluene diisocyanate, 2,6-toluene diisocyanate, 1,3-xlylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl)isocyanate, 2,2,4-trimethylhexamethylene diisocyanate, bis(2-isocyanate-ethyl)fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate and 2,5(or 6)-bis(isocyanatomethyl)-bicyclo[2.2.1]heptane.

Among these diisocyanates, 2,4-toluene diisocyanate, isophorone diisocyanate, xylylene diisocyanate, and methylenebis(4-cyclohexylisocyanate) are particularly preferred. These diisocyanate compounds are used either individually or in combination of two or more.

Microbends are sharp but microscopic curvatures in an optical fiber involving local axial displacements of a few micrometers and spatial wavelengths of a few millimeters. Microbends can be induced by thermal stresses and/or mechanical lateral forces. When present, microbends attenuate the signal transmission capability of the coated optical fiber. Attenuation is the undesirable reduction of signal carried by the optical fiber.

The relatively soft inner Primary Coating provides resistance to microbending which results in attenuation of the signal transmission capability of the coated optical fiber and is therefore undesirable. Microbends are sharp but microscopic curvatures in the optical fiber involving local axial displacements of a few micrometers and spatial wavelengths of a few millimeters. Microbends can be induced by thermal stresses and/or mechanical lateral forces. Coatings can provide lateral force protection that protects the optical fiber from microbending, but as coating diameter decreases the amount of protection provided decreases. The relationship between coatings and protection from lateral stress that leads to microbending is discussed, for example, in D. Gloge, "Optical-fiber packaging and its influence on fiber straightness and loss", Bell System Technical Journal, Vol. 54, 2, 245 (1975); W. B. Gardner, "Microbending Loss in Optical Fibers", Bell System Technical Journal, Vol. 54, No. 2, p. 457 (1975); T. Yabuta, "Structural Analysis of Jacketed Optical Fibers Under Lateral Pressure", J. Lightwave Tech., Vol. LT-1, No. 4, p. 529 (1983); L. L. Blyler, "Polymer Coatings for Optical Fibers", Chemtech, p. 682 (1987); J. Baldauf, "Relationship of Mechanical Characteristics of Dual Coated Single Mode Optical Fibers and Microbending Loss", IEICE Trans. Commun., Vol. E76-B, No. 4, 352 (1993); and K. Kobayashi, "Study of Microbending Loss in Thin Coated Fibers and Fiber Ribbons", IWCS, 386 (1993). The harder outer Primary Coating, that is, the Secondary Coating, provides resistance to handling forces such as those encountered when the coated fiber is ribboned and/or cabled.

Optical fiber Secondary Coating compositions generally comprise, before cure, a mixture of ethylenically-unsaturated compounds, often consisting of one or more oligomers dissolved or dispersed in liquid ethylenically-unsaturated diluents and photoinitiators. The coating composition is typically applied to the optical fiber in liquid form and then exposed to actinic radiation to effect cure.

In many of these compositions, use is made of a urethane oligomer having reactive termini and a polymer backbone. Further, the compositions generally comprise reactive diluents, photoinitiators to render the compositions UV-curable, and other suitable additives.

Published PCT Patent Application WO 2005/026228 A1, published Sep. 17, 2004, "Curable Liquid Resin Composition", with named inventors Sugimoto, Kamo, Shigemoto, Komiya and Steeman describes and claims a curable liquid resin composition comprising: (A) a urethane (meth)acrylate having a structure originating from a polyol and a number average molecular weight of 800 g/mol or more, but less than 6000 g/mol, and (B) a urethane (meth)acrylate having a structure originating from a polyol and a number average molecular weight of 6000 g/mol or more, but less than 20,000 g/mol, wherein the total amount of the component (A) and component (B) is 20-95 wt % of the curable liquid resin composition and the content of the component (B) is 0.1-30 wt % of the total of the component (A) and component (B).

Many materials have been suggested for use as the polymer backbone for the urethane oligomer. For example, polyols such as hydrocarbon polyols, polyether polyols, polycarbonate polyols and polyester polyols have been used in urethane oligomers. Polyester polyols are particularly attractive because of their commercial availability, oxidative stability and versatility to tailor the characteristics of the coating by tailoring the backbone. The use of polyester polyols as the backbone polymer in a urethane acrylate oligomer is described, for example, in U.S. Pat. Nos. 5,146,531, 6,023,547, 6,584,263, 6,707,977, 6,775,451 and 6,862,392, as well as European Patent 539 030 A.

Concern over the cost, use and handling of urethane precursors has lead to the use of urethane-free oligomers in coating compositions. For example, urethane-free polyester acrylate oligomers have been used in radiation-curable coating compositions for optical glass fibers. Japanese Patent 57-092552 (Nitto Electric) discloses all optical glass fiber coating material comprising a polyester di(meth)acrylate where the polyester backbone has an average molecular weight of 300 or more. German Patent Application 04 12 68 60 A1 (Bayer) discloses a matrix material for a three-fiber ribbon consisting of a polyester acrylate oligomer, 2-(N-butyl-carbamyl)ethylacrylate as reactive diluent and 2-hydroxy-2-methyl-1-phenyl-propan-1-one as photoinitiator. Japanese Patent Application No. 10-243227 (Publication No. 2000-072821) discloses a liquid curable resin composition comprising a polyester acrylate oligomer which consists of a polyether diol end-capped with two diacids or anhydrides and terminated with hydroxy ethyl acrylate. U.S. Pat. No. 6,714,712 B2 discloses a radiation curable coating composition comprising a polyester and/or alkyd (meth)acrylate oligomer comprising a polyacid residue or an anhydride thereof, optionally a reactive diluent, and optionally a photoinitiator. Also, Mark D. Soucek and Aaron H. Johnson disclose the use of hexahydrophthalic acid for hydrolytic resistance in "New Intramolecular Effect Observed for Polyesters: An Anomeric Effect," JCT Research, Vol. 1, No. 2, p. 111 (April 2004).

While a number of optical fiber coatings are currently available, it is desirable to provide novel optical fiber coatings which have improved manufacturing and/or performance properties relative to existing coatings.

SUMMARY OF THE INVENTION

The first aspect of the instant claimed invention is a Supercoating suitable for coating an optical fiber;
wherein the Supercoating comprises at least two layers, wherein the first layer is a Primary Coating that is in contact with the outer surface of the optical fiber and the second layer is a Secondary Coating in contact with the outer surface of the Primary Coating,
wherein the cured Primary Coating on the optical fiber has the following properties after initial cure and after one month aging at 85° C. and 85% relative humidity:
A) a % RAU of from about 84% to about 99%;
B) an in-situ modulus of between about 0.15 MPa and about 0.60 MPa; and
C) a Tube Tg, of from about −25° C. to about −55° C.;
wherein the cured Secondary Coating on the optical fiber has the following properties after initial cure and after one month aging at 85° C. and 85% relative humidity:
A) a % RAU of from about 80% to about 98%;
B) an in-situ modulus of between about 0.60 GPa and about 1.90 GPa; and C) a Tube Tg, of from about 50° C. to about 80° C.

The second aspect of the instant claimed invention is an optical fiber coated with the Supercoating of the first aspect of the instant claimed invention.

The third aspect of the instant claimed invention is a Supercoating suitable for coating wire wherein the Supercoating comprises at least two layers, wherein the first layer is a Primary Coating that is in contact with the outer surface of the wire and the second layer is a Secondary Coating in contact with the outer surface of the Primary Coating;

wherein the cured Primary Coating on the wire has the following properties after initial cure and after one month aging at 85° C. and 85% relative humidity:
A) a % RAU of from about 84% to about 99%;
B) an in-situ modulus of between about 0.15 MPa and about 0.60 MPa; and
C) a Tube Tg, of from about −25° C. to about −55° C.; and
wherein the cured Secondary Coating on the wire has the following properties after initial cure and after one month aging at 85° C. and 85% relative humidity:

A) a % RAU of from about 80% to about 98%;
B) an in-situ modulus of between about 0.60 GPa and about 1.90 GPa; and
C) a Tube Tg, of from about 50° C. to about 80° C.

The fourth aspect of the instant claimed invention is a wire coated with the Supercoating of the third aspect of the instant claimed invention.

The fifth aspect of the instant claimed invention is a process to coat an optical fiber with a Supercoating, comprising the steps of
 (i) operating a glass drawing tower to produce a glass optical fiber;
 (ii) coating said glass optical fiber with the Supercoating of claim 1;
 (iii) applying radiation to said Supercoating to cure said Supercoating,
wherein said radiation may be applied sequentially, first to the Primary Coating and then to the Secondary Coating, known as wet on dry application; or the radiation may be applied concurrently to the Primary Coating and the Secondary Coating, known as wet on wet application.

DETAILED DESCRIPTION OF THE INVENTION

Throughout this patent application the following abbreviations have the indicated meanings:

| Abbreviation | Meaning |
|---|---|
| A-189 | γ-mercaptopropyltrimethoxysilane available from General Electric |
| Acclaim 4200 | polypropylene glycol, MW = 4200, available from Bayer |
| BHT | 2,6-di-tert-butyl-4-methylphenol, available from Fitz Chem. |
| TPO | 2,4,6-trimethylbenzoyldiphenylphosphine oxide |
| Chivacure TPO | 2,4,6-trimethylbenzoyldiphenylphosphine oxide, available from Chitec |
| Darocur TPO | 2,4,6-trimethylbenzoyldiphenylphosphine oxide, available from Ciba Geigy |
| Lucirin TPO | 2,4,6-trimethylbenzoyldiphenylphosphine oxide, available from BASF |
| Irgacure 819 | bis(2,4,6-trimethylbenzoyl)phenylphosphine oxide, available from Ciba Geigy |
| TPP | triphenylphosphine |
| CAS | means Chemical Abstracts Registry Number |
| CN-120Z | epoxy diacrylate, available from Sartomer |
| Coscat 83 | a proprietary organobismuth catalyst, available from CasChem, or G. R. O'Shea Company or Vortellus Specialities Inc. |
| DABCO | 1,4-diazabicyclo[2.2.2]octane, available from Air Products |
| DBTDL | dibutyl tin dilaurate, available from OMG Americas |
| HEA | hydroxyethyl acrylate, available from BASF |
| HHPA | hexahydrophthalic anhydride, available from Milliken Chemical |
| Chivacure 184 | 1-hydroxycyclohexyl phenyl ketone, available from Chitec |
| Irgacure 184 | 1-hydroxycyclohexyl phenyl ketone, available from Ciba Geigy |
| Irganox 1035 | thiodiethylene bis(3,5-di-tert-butyl-4-hydroxyphenyl)propionate), available from Ciba Geigy |
| PPA6 | polypropylene glycol monoacrylate |
| P1010 | polypropylene glycol (MW = 1000), available from BASF |
| P2010 | polypropylene glycol (MW = 2000), available from BASF |
| Photomer 4066 | ethoxylated nonylphenol acrylate, available from Cognis |
| SR-306 | tripropylene glycol diacrylate (TPGDA), available from Sartomer |
| SR-306HP | tripropylene glycol diacrylate (TPGDA), available from Sartomer |
| SR-349 | ethoxylated (3) bisphenol A diacrylate, available from Sartomer |
| SR-368 | tris(2-hydroxyethyl)isocyanurate triacrylate, available from Sartomer |
| SR-395 | isodecyl acrylate, available from Sartomer |
| SR-444 | pentaerythritol triacrylate, available from Sartomer |
| SR-504D | ethoxylated nonyl phenol acrylate, available from Sartomer |
| SR-506 | isobornyl acrylate, available from Sartomer |
| IPDI | isophorone diisocyanate, available from Bayer |
| TDI | toluene diisocyanate, 80/20 mixture of 2,4- and 2,6-isomers; available from BASF |
| TPGMA | tripropylene glycol monoacrylate |
| TPGDA | tripropylene glycol diacrylate |
| Lupranate T80 | toluene diisocyanate, mixture of 80% 2,4-isomer and 20% 2,6-isomer available from BASF |
| TDS | 100% 2,4-isomer of toluene diisocyanate, available from Bayer |
| Tinuvin 123 | bis(1-octyloxy-2,2,6,6-tetramethyl-4-piperidyl)sebacate, available from Ciba Geigy |

The instant claimed invention is a Supercoating suitable for coating an optical fiber, wherein said Supercoating comprises at least two layers. The first layer is a Primary Coating that is in contact with the outer surface of the optical fiber and the second layer is a Secondary Coating in contact with the outer surface of the Primary Coating.

Primary Coating

Primary Coatings suitable for use in the Supercoating of the present invention typically comprise a Primary Oligomer, one or more diluent monomers, one or more photoinitiators, an antioxidant, an adhesion promoter and optionally one or more light stabilizers. Preferably the Primary Coatings are selected from the group consisting of the CR Primary Coating, the P Primary Coating, the CA Primary Coating and the BJ Primary Coating.

The CR Primary Coating comprises (a) a CR Primary Oligomer; (b) a diluent monomer; (c) a photoinitiator; (d) an antioxidant; and (e) an adhesion promoter. The P Primary Coating comprises (a) a P Primary Oligomer; (b) a first diluent monomer; (c) a second diluent monomer; (d) a photoinitiator; (e) an antioxidant; and (f) an adhesion promoter. The CA Primary Coating comprises (a) a CA Primary Oligomer; (b) a diluent monomer; a photoinitiator; an antioxidant; and an adhesion promoter. The BJ Primary Coating comprises (a) a BJ Primary Oligomer; (b) a first diluent monomer; (c) a second diluent monomer; (d) a third diluent monomer; (e) a first light stabilizer; (f) a first photoinitiator; (g) second photoinitiator; (h) an antioxidant; (i) a second light stabilizer; and (j) an adhesion promoter.

Primary Oligomer

The Primary Oligomer used to form the Primary Coatings of the invention is prepared by reaction of a hydroxyl-containing (meth)acrylate, one or more isocyanates, and a polyether polyol in the presence of a catalyst and a polymerization inhibitor. The CR Primary Oligomer is prepared by the reaction of a hydroxyl-containing (meth)acrylate; a first isocyanate; a second isocyanate; a polyether polyol; a catalyst; and a polymerization inhibitor. The P Primary Oligomer is prepared by reaction of a hydroxyl-containing (meth)acrylate; a first isocyanate; a second isocyanate; a polyether polyol; a catalyst; and a polymerization inhibitor. The CA Primary Oligomer is prepared by the reaction of a hydroxyl-containing (meth)acrylate; a first isocyanate; a second isocyanate; a polyether polyol; a catalyst; and a polymerization inhibitor. The BJ Primary Oligomer is prepared by reaction of a hydroxyl-containing (meth)acrylate; an isocyanate; a polyether polyol; a polymerization inhibitor; and a catalyst.

The hydroxyl-containing (meth)acrylate used to prepare the Primary Oligomer is desirably a hydroxyalkyl (meth)acrylate such as hydroxyethyl acrylate (HEA), or an acrylate selected from the group consisting of polypropylene glycol monoacrylate (PPA6), tripropylene glycol monoacrylate (TPGMA), caprolactone acrylates, and pentaerythritol triacrylate (e.g., SR-444). When the Primary Coating is the CR, P, CA or BJ Primary Coating, the hydroxyl-containing (meth)acrylate preferably is HEA.

The isocyanate may be of any suitable type, e.g., aromatic or aliphatic, but desirably is a diisocyanate. Suitable diisocyanates are known in the art, and include, for example, isophorone diisocyanate (IPDI), toluene diisocyanate (TDI, mixture of 80% 2,4-isomer and 20% 2,6-isomer available from BASF and TDS, 100% 2,4-isomer of toluene diisocyanate). When the Primary Coating is the CR, P or CA Primary Coating, the first isocyanate preferably is TDI and the second isocyanate preferably is IPDI. When the Primary Coating is the BJ Primary Coating, the isocyanate preferably is IPDI.

The polyether polyol is selected from the group consisting of polyethylene glycol and polypropylene glycol. Preferably the polyether polyol is a polypropylene glycol having a number average molecular weight of about 300 g/mol to about 5,000 g/mol. When the Primary Coating is the CR, P or CA Primary Coating, the polyether polyol preferably is Pluracol P2010, available from BASF. When the Primary Coating is the BJ Primary Coating, the polyether polyol preferably is Acclaim 4200 polypropylene glycol, available from Bayer.

Catalysts in the art of synthesizing urethane based oligomers for use in Radiation Curable Coatings for optical fiber are known in the art. The catalyst is selected from the group consisting of copper naphthenate, cobalt naphthenate, zinc naphthenate, triethylamine, triethylenediamine, 2-methyltriethyleneamine, dibutyl tin dilaurate; metal carboxylates, including, but not limited to: organobismuth catalysts such as bismuth neodecanoate, CAS 34364-26-6; zinc neodecanoate, CAS 27253-29-8; zirconium neodecanoate, CAS 39049-04-2; and zinc 2-ethylhexanoate, CAS 136-53-8; sulfonic acids, including but not limited to dodecylbenzene sulfonic acid, CAS 27176-87-0; and methane sulfonic acid, CAS 75-75-2; amino or organo-base catalysts, including, but not limited to: 1,2-dimethylimidazole, CAS 1739-84-0; and diazabicyclo [2.2.2]octane (DABCO), CAS 280-57-9 (strong base); and triphenyl phosphine; alkoxides of zirconium and titanium, including, but not limited to zirconium butoxide, (tetrabutyl zirconate) CAS 1071-76-7; and titanium butoxide, (tetrabutyl titanate) CAS 5593-70-4; and ionic liquid phosphonium, imidazolium, and pyridinium salts, such as, but not limited to, trihexyl(tetradecyl)phosphonium hexafluorophosphate, CAS No. 374683-44-0; 1-butyl-3-methylimidazolium acetate, CAS No. 284049-75-8; and N-butyl-4-methylpyridinium chloride, CAS No. 125652-55-3; and tetradecyl(trihexyl) phosphonium.

All of these catalysts are commercially available.

The amount of catalyst used in the oligomer synthesis is from about 0.01% to about 3%, based on the weight of the overall coating composition. When the Primary Coating is the CR, P or BJ Primary Coating, the catalyst preferably is DBTDL. When the Primary Coating is the CA Primary Coating, the catalyst preferably is an organobismuth catalyst such as "Coscat 83" proprietary organobismuth catalyst, available from CosChem.

The preparation of the Primary Oligomer is conducted in the presence of a polymerization inhibitor which is used to inhibit the polymerization of acrylate during the reaction. The polymerization inhibitor is selected from the group consisting of butylated hydroxytoluene (BHT), hydroquinone and derivatives thereof such as methylether hydroquinone and 2,5-dibutyl hydroquinone; 3,5-di-tert-butyl-4-hydroxytoluene; methyl-di-tert-butylphenol; 2,6-di-tert-butyl-p-cresol; and the like. When the Primary Oligomer is the CR, P, CA or BJ Primary Oligomer, the polymerization inhibitor preferably is BHT.

Diluent Monomer

The diluent monomers are low viscosity monomers having at least one functional group capable of polymerization when exposed to actinic radiation. For example, the diluent monomer can be a monomer or mixture of monomers having an acrylate or vinyl ether functionality and a $C_4$-$C_{20}$ alkyl or polyether moiety. Particular examples of such diluent monomers include hexylacrylate, 2-ethylhexylacrylate, isobornylacrylate, decylacrylate, laurylacrylate, stearylacrylate, 2-ethoxyethoxy-ethylacrylate, laurylvinylether, 2-ethylhexylvinyl ether, isodecyl acrylate (e.g., SR 395, available from Sartomer), isooctyl acrylate, N-vinyl-caprolactam, N-vinylpyrrolidone, tripropylene glycol monoacrylate (TPGMA), acrylamides, and the alkoxylated derivatives, such as, ethoxylated lauryl acrylate, ethoxylated isodecyl acrylate, and the like.

Another type of diluent monomer that can be used is a compound having an aromatic group. Particular examples of diluent monomers having an aromatic group include ethylene glycol phenyl ether acrylate, polyethylene glycol phenyl ether acrylate, polypropylene glycol phenyl ether acrylate, and alkyl-substituted phenyl derivatives of the above monomers, such as polyethylene glycol nonylphenyl ether acrylate. A preferred diluent monomer is ethoxylated nonylphenol acrylate (e.g., Photomer 4066, available from Cognis; SR504D, available from Sartomer).

The diluent monomer can also comprise a diluent having two or more functional groups capable of polymerization. Particular examples of such diluents include $C_2$-$C_{18}$ hydrocarbon diol diacrylates, $C_4$-$C_{18}$ hydrocarbon divinylethers, $C_3$-$C_{18}$ hydrocarbon triacrylates, and the polyether analogues thereof, and the like, such as 1,6-hexanedioldiacrylate, trimethylolpropanetriacrylate, hexanedioldivinylether, triethylenle glycol diacrylate, pentaerythritol triacrylate, ethoxylated bisphenol A diacrylate, tripropyleneglycol diacrylate (TPGDA, e.g., SR 306; SR 306HP available from Sartomer), and tris-2-hydroxyethyl isocyanurate triacrylate (e.g., SR-368 available from Sartomer).

When the Primary Coating is the CR or CA Primary Coating, the diluent monomer preferably is ethoxylated nonyl phenol acrylate (e.g., Photomer 4066). When the Primary Coating is the P Primary Coating, the first diluent monomer preferably is ethoxylated nonyl phenol acrylate (Photomer 4066) and the second diluent monomer is tripropylene glycol diacrylate (SR-306). When the Primary Coating is the BJ Primary Coating, the first diluent monomer preferably is ethoxylated nonyl phenol acrylate (e.g., SR 504D), the second diluent monomer is ethoxylated bisphenol A diacrylate (e.g., SR-349), and the third diluent monomer is isodecyl acrylate (e.g., SR 395).

Photoinitiator

The Primary Coatings can contain a single photoinitiator or a combination of photoinitiators. Suitable photoinitiators include α-hydroxyketo-type photoinitiators and phosphine oxide type photoinitiators.

The α-hydroxyketo-type photoinitiators include 1-hydroxycyclohexyl phenyl ketone (e.g., Irgacure 184, available from Ciba Geigy; Chivacure 184, available from Chitec Chemicals), 2-hydroxy-2-methyl-1-phenyl-propan-1-one (e.g., Darocur 1173, available from Ciba Geigy), 2-benzyl-2-dimethylamino-1-(4-morpholinophenyl)-butan-1-one, 2,2-dimethoxy-2-phenyl-acetophenone, 2-methyl-1-[4-(methylthio)phenyl]-2-(4-morpholinyl)-1-propanone, 2-methyl-1-(4-(methylthio)phenyl]-2-morpholinopropan-1-one (e.g., Irgacure 907, available from Ciba Geigy), 4-(2-hydroxyethoxy)phenyl-2-hydroxy-2-propyl ketone dimethoxy-phenylacetophenone, 1-(4-isopropylphenyl)-2-hydroxy-2-methyl-propan-1-one, 1-(4-dodecylphenyl)-2-hydroxy-2-methylpropan-1-one, and 4-(2-hydroxyethoxy)phenyl-2-(2-hydroxy-2-propyl)ketone.

Phosphine oxide type photoinitiators include 2,4,6-trimethylbenzoyl-diphenylphosphine oxide type (TPO; e.g., Lucirin TPO available from BASF; Darocur TPO, available from Ciba Geigy), bis(2,4,6-trimethylbenzoyl)phenylphosphine oxide (e.g., Irgacure 819, available from Ciba Geigy), or bisacyl phosphine oxide type (BAPO) photoinitiators. A preferred combination of photoinitiators is Irgacure 184 and TPO.

When the Primary Coating is the CR or CA Primary Coating, the photoinitiator preferably is 2,4,6-trimethylbenzoyl-diphenylphosphine oxide (TPO) (e.g., Chivacure TPO, available from Chitec). When the Primary Coating is the P Primary Coating, the photoinitiator preferably is bis(2,4,6-trimethylbenzoyl)phenylphosphine oxide (e.g., Irgacure 819). When the Primary Coating is the BJ Primary Coating, the first photoinitiator preferably is TPO (e.g., Chivacure TPO, available from Chitec) and the second photoinitiator preferably is 1-hydroxycyclohexyl phenyl ketone (e.g., Chivacure 184).

Antioxidant

The antioxidant is a sterically hindered phenolic compound, for example 2,6-ditertiarybutyl-4-methylphenol, 2,6-ditertiarybutyl-4-ethyl phenols 2,6-ditertiarybutyl-4-n-butyl phenol, 4-hydroxymethyl-2,6-ditertiarybutyl phenol, and such commercially available compounds as thiodiethylene bis(3,5-ditertiarybutyl-4-hydroxyl)hydrocinnamate, octadecyl-3,5-ditertiarybutyl-4-hydroxyhydrocinnamate, 1,6-hexamethylene bis(3,5-ditertiarybutyl-4-hydroxyhydrocinnamate), and tetrakis(methylene(3,5-ditertiary-butyl-4-hydroxyhydrocinnamate))methane, all available as Irganox 1035, 1076, 259 and 1010, respectively, from Ciba Geigy. Other examples of sterically hindered phenolics useful herein include 1,3,5-trimethyl-2,4,6-tris(3,5-ditertiarybutyl-4-hydroxybenzyl)benzene and 4,4'-methylene-bis(2,6-ditertiarybutylphenol), available as Ethyl 330 and 702, respectively, from Ethyl Corporation. When the Primary Coating is the CR, P, CA or BJ Primary Coating, the antioxidant preferably is thiodiethylene bis(3,5-ditertiarybutyl-4-hydroxyl)hydrocinnamate (e.g., Irganox 1035).

Adhesion Promoter

Suitable adhesion promoters include bis-(triethoxysilylpropyl)disulfide, bis-(triethoxysilylpropyl)tetrasulfide, γ-aminopropyltriethoxysilane, γ-glycidoxypropyltrimethoxysilane, γ-mercaptopropyltriethoxysilane, γ-mercaptopropyltrimethoxysilane (e.g., Silquest A-189, available from General Electric), γ-methacryloxypropyltriethoxysilane, γ-methacryloxypropyltrimethoxysilane, γ-ureidopropylltrimethoxysilane, methyltris(isopropenoxy)silane, N-beta-(aminoethyl)-γ-aminopropyltrimethoxysilane, (N,N-dimethyl-3-aminopropyl)silane, polydimethylsiloxane, vinyltriethoxysilane, tris-(3-(Trimethoxysilyl)propyl)isocyanurate, or a combination thereof. When the Primary Coating is the CR, P, CA or BJ Primary Coating, the adhesion promoter preferably is γ-mercaptopropyltrimethoxysilane (e.g., Silquest A-189, available from General Electric).

Light Stabilizer

Suitable light stabilizers are known in the art of radiation curable coatings and are commercially available and include ultraviolet light absorbers belonging to the benzophenone class of UVAs, including 2-hydroxy-4-methoxybenzophenone (e.g., Lowilite 20, available from Great Lakes Chemical) and hindered amine light stabilizers (HALS), including bis(1-octyloxy-2,2,6,6-tetramethyl-4-piperidyl)sebacate (e.g., Tinuvin 123, available from Ciba Geigy). When the Primary Coating is the BJ Primary Coating, the first light stabilizer preferably is bis(1-octyloxy-2,2,6,6-tetramethyl-4-piperidyl)sebacate (e.g., Tinuvin 123, available from Ciba Geigy) and the second light stabilizer preferably is 2-hydroxy-4-methoxybenzophenone (e.g., Lowilite 20).

A preferred embodiment of the CR Primary Oligomer is as follows, with wt. % reported based on the weight percent of the components used to prepare the oligomer
   hydroxyl-containing (meth)acrylate (e.g., HEA): about 1 to about 3 wt. %
   aromatic isocyanate (e.g., TDI): about 1 to about 2 wt. %
   aliphataic isocyanate (e.g., IPDI): about 4 to about 6 wt. %
   polyether polyol (e.g., P2010): about 40 to about 60 wt. %
   catalyst (e.g., DBTDL): about 0.01 to about 0.05 wt. %
   polymerization inhibitor (e.g., BHT): about 0.05 to about 0.10 wt. %

In a preferred embodiment of the CR Primary Coating, in addition to the about 20 Wt. % to about 80 wt. % of the CR Primary Oligomer, the components of the curable composition may include (based on the weight percent of the curable composition):

diluent monomer (e.g., Photomer 4066): about 35 to about 45 wt. %;

photoinitiator (e.g., Chivacure TPO): about 1.00 to about 2.00 wt. %;

antioxidant (e.g., Irganox 1035): about 0.25 to about 0.75 wt. %;

adhesion promoter (e.g., A-189): about 0.8 to about 1.0 wt. %*

*may be adjusted to achieve 100 wt. %

A more preferred embodiment of the CR Primary Coating is as follows:

| CR Primary Oligomer | wt. % |
| --- | --- |
| hydroxyl-containing (meth)acrylate (HEA) | 2.11 |
| aromatic isocyanate (TDI) | 1.59 |
| aliphatic isocyanate (IPDI) | 5.31 |
| polyether polyol (P2010) | 46.9 |
| inhibitor (BHT) | 0.08 |
| catalyst (DBTDL) | 0.03 |

| CR Primary Coating | wt. % |
| --- | --- |
| CR Primary Oligomer | 56.0 |
| diluent monomer (Photomer 4066) | 40.9 |
| photoinitiator (Chivacure TPO) | 1.70 |
| antioxidant (Irganox 1035) | 0.50 |
| adhesion promoter (A-189) | 0.90 |

A preferred embodiment of the CA Primary Oligomer, with wt. % reported based on the weight percent of the components used to prepare the oligomer, is as follows:

hydroxyl-containing (meth)acrylate (e.g., HEA): about 1 to about 3 wt. % aromatic isocyanate (e.g., TDA): about 1 to about 2 wt. % aliphataic isocyanate (e.g., IPDI): about 4 to about 6 wt. % polyether polyol (e.g., P2010); about 40 to about 60 wt. % catalyst (e.g., Coscat 83): about 0.01 to about 0.05 wt. % polymerization inhibitor (e.g., BHT): about 0.05 to about 0.10 wt. %

A preferred embodiment of the CA Primary Coating is as follows: In addition to from about 40 wt. % to about 70 wt. % of the CA Primary Oligomer, the components of the curable composition may include (based on the weight percent of the curable composition):

diluent monomer (e.g., Photomer 4066): about 35 to about 45 wt. %;

photoinitiator (e.g., Chivacure TPO); about 1.00 to about 2.00 wt. %;

antioxidant (e.g., Irganox 1035): about 0.25 to about 0.75 wt. %;

adhesion promoter (e.g., A-189): about 0.8 to about 1.0 wt. %*

*may be adjusted to achieve 100 wt. %

A more preferred embodiment of the CA Primary Coating is as follows:

| Primary Oligomer | wt. % |
| --- | --- |
| hydroxyethyl acrylate (HEA) | 1.84 |
| aromatic isocyanate (TDI) | 1.38 |
| aliphatic isocyanate (IPDI) | 5.28 |
| polyether polyol (P2010) | 47.40 |
| polymerization inhibitor (BHT) | 0.08 |
| catalyst (Coscat 83) | 0.03 |

| CA Primary Coating | wt. % |
| --- | --- |
| CA Primary Oligomer | 56.0 |
| diluent monomer (Photomer 4066) | 40.9 |
| photoinitiator (Chivacure TPO) | 1.70 |
| antioxidant (Irganox 1035) | 0.50 |
| adhesion promoter (A-189) | 0.90 |

The following examples are provided as illustrative of the P Primary Oligomer and P Primary Coating.

| | Example 1 | Example 2 | Example 3 |
| --- | --- | --- | --- |
| P Primary Oligomer | | | |
| Hydroxyl ethyl acrylate (HEA) | 1.41 | 1.61 | 1.54 |
| aromatic isocyanate (TDI) | 1.05 | 1.20 | 1.15 |
| aliphatic isocyanate (IPDI) | 4.71 | 4.68 | 5.13 |
| polyether polyol (P2010) | 42.24 | 42.40 | 46.07 |
| catalyst (Coscat 83) | 0.03 | 0.03 | 0.03 |
| polymerization inhibitor (BHT) | 0.08 | 0.08 | 0.08 |
| | 49.50 | 50.00 | 54.00 |
| P Primary Coating | | | |
| first diluent (Photomer 4066) | 47.00 | 46.40 | 41.90 |
| second diluent (SR306) | 1.00 | 0.80 | 1.00 |
| photoinitiator (Chivacure TPO) | 1.10 | 1.40 | 1.70 |
| antioxidant (Irgacure 1035) | 0.50 | 0.50 | 0.50 |
| adhesion promoter (A-189 | 0.90 | 0.90 | 0.90 |
| | 100.00 | 100.00 | 100.00 |

| | Example 4 | Example 5 | Example 6 |
| --- | --- | --- | --- |
| Primary Coating Oligomer | | | |
| Acrylate (HEA) | 1.84 | 1.48 | 1.54 |
| Aromatic isocyanate (TDI) | 1.38 | 1.11 | 1.15 |
| Aliphatic isocyanate (IPDI) | 5.28 | 4.94 | 5.13 |
| Polyol (P2010) | 47.40 | 44.38 | 46.07 |
| Catalyst (DBTDL) | 0.03 | 0.03 | 0.03 |
| Inhibitor (BHT) | 0.08 | 0.08 | 0.08 |
| | 56.00 | 52.00 | 54.00 |
| Radiation Curable Coating Composition | | | |
| First Diluent (Photomer 4066) | 40.90 | 44.50 | 41.90 |
| Second Diluent (SR306) | 0.95 | 1.00 | 1.00 |
| Photoinitiator (Chivacure TPO) | 1.70 | 1.40 | 1.70 |
| Photoinitiator (Irgancure 819) | — | 1.10 | — |
| Antioxidant (Irgacure 1035) | 0.50 | 0.50 | 0.50 |
| Adhesion Promoter A-189 | 0.90 | 0.90 | 0.90 |
| | 100.00 | 100.00 | 100.00 |

A preferred embodiment of the BJ Primary Oligomer is as follows:

| | |
|---|---|
| hydroxyl-containing (meth)acrylate (e.g., HEA) | about 1 to about 5 wt % |
| isocyanate (e.g., IPDI) | about 2 to about 8 wt % |
| polyether polyol (e.g., Acclaim 4200) | about 55 to about 75 wt % |
| polymerization inhibitor (e.g., BHT) | about 0.05 to about 0.20 wt % |
| catalyst (e.g., DBTDL) | about 0.030 to about 0.060 wt % |
| diluent monomer (e.g., SR-395) | about 5 to about 7 wt % |

A preferred embodiment of the BJ Primary Coating is as follows:

| Primary Coating Oligomer | Wt. % |
|---|---|
| hydroxy-containing (meth)acrylate (HEA) | 1.84 |
| isocyanate (IPDI) | 4.14 |
| polyether polyol (Acclaim 4200) | 62.11 |
| polymerization inhibitor (BHT) | 0.061 |
| catalyst (DBTDL) | 0.034 |
| diluent monomer (SR 395) | 5.81 |

| Radiation Curable Coating Composition | Wt. % |
|---|---|
| Primary Coating Oligomer | 74.0 |
| diluent monomer (SR 504 D) | 10.4 |
| diluent monomer (SR 349) | 5.0 |
| diluent monomer (SR 395) | 6.0 |
| first photoinitiator (Chivacure TPO) | .30 |
| second photoinitiator (Chivacure 184) | 1.00 |
| antioxidant (Irganox 1035) | 0.75 |
| first light stabilizer (Tinuvin 123) | 0.4 |
| second light stabilizer (Lowilite 20) | 0.15 |
| adhesion promoter (A-189) | q.s. |

Secondary Coating

Secondary Coatings suitable for use in the Supercoating of the present invention typically comprise a Secondary Coating Oligomer Blend, one or more diluent monomers, one or more photoinitiators, an antioxidant, and optionally one or more slip additives. Preferably the Primary Coatings are selected from the group consisting of the D Secondary Coating and the R Secondary Coating.

The D Secondary Coating comprises (a) a D Secondary Coating Oligomer Blend, which is mixed with (b) a first diluent monomer; (c) a second diluent monomer; (d) a third diluent monomer; (e) an antioxidant; (f) a first photoinitiator; (g) a second photoinitiator; and (h) optionally a slip additive or a blend of slip additives.

D Secondary Coating Oligomer Blend

The D Secondary Coating Oligomer Blend comprises an Omega Oligomer and an Upsilon Oligomer.

The Omega Oligomer is prepared by reaction of a hydroxyl-containing (meth)acrylate, an isocyanate, a polyether polyol, and a tripropylene glycol in the presence of an antioxidant for polymerization and a catalyst.

The Upsilon Oligomer is an epoxy diacrylate. Preferably the Upsilon Oligomer is a bisphenol A based epoxy diacrylate oligomer, for example CN120 or CN120Z oligomer sold by Sartomer. More preferably the Upsilon Oligomer is CN120Z.

A preferred weight percent of each component of the D Radiation Curable Secondary Coating Composition of the instant claimed invention is as follows:

| Omega Oligomer | |
|---|---|
| hydroxyl-containing (meth)acrylate | from about 5 to about 7 wt. % |
| isocyanate | from about 7 to about 9 wt. % |
| polyether polyol | from about 15 to about 18 wt. % |
| tripropylene glycol | from about 0.3 to about 0.6 wt. % |
| polymerization inhibitor | from about 0.01 to about 0.03 wt. % |
| catalyst | from about 0.06 to about 0.1 wt. % |

| Upsilon Oligomer | |
|---|---|
| epoxy diacrylate | from about 20 to about 25 wt. % |

| Diluent Monomers | |
|---|---|
| first diluent monomer | from about 4 to about 7 wt. % |
| second diluent monomer | from about 15 to about 25 wt. % |
| third diluent monomer | from about 13 to about 19 wt. % |

| Other Additives | |
|---|---|
| antioxidant | from about 0.3 to about 0.7 wt. % |
| first photoinitiator | from about 1.75 to about 3.75 wt. % |
| second photoinitiator | from about 0.5 to about 1 wt. % |
| slip additives (optional) | from about 0.35 to about 0.75 wt. % |

The R Secondary Coating comprises (a) a R Secondary Coating Oligomer Blend, which is mixed with (b) a first diluent monomer, (c) a second diluent monomer, (d) an antioxidant; (e) a first photoinitiator; (f) a second photoinitiator; and (g) optionally a slip additive or a blend of slip additives. The R Secondary Coating Oligomer Blend must contain at least one non-urethane containing oligomer, the alpha oligomer. The second oligomer, known as the beta oligomer, in the R Secondary Coating Oligomer Blend may be urethane containing or non-urethane containing, but whichever it is, it must not be the same as the alpha oligomer. There may be a third, or gamma oligomer in the blend. If the gamma oligomer is present, it typically is an Epoxy.

In a preferred embodiment of the R Radiation Curable Secondary Coating, an alpha, beta and gamma oligomer are all present in the oligomer blend. The following composition is found in a preferred weight percent of each component of the Radiation Curable Secondary Coating Composition as follows:

| Alpha Oligomer | |
|---|---|
| anhydride | from about 5 to about 7 wt. % |
| hydroxyl-containing (meth)acrylate | from about 3 to about 5 wt. % |
| epoxy | from about 5 to about 9 wt. % |
| first catalyst | from about 0.005 to about 0.25 wt. % |
| second catalyst | from about 0.01 to about 0.05 wt. % |
| polymerization inhibitor | from about 0.01 to about 0.05 wt. % |

| Beta Oligomer | |
| --- | --- |
| hydroxyl-containing (meth)acrylate | from about 3 to about 5 wt. % |
| isocyanate | from about 4 to about 6 wt. % |
| polyether polyol | from about 13 to about 17 wt. % |
| polymerization inhibitor | from about 0.01 to about 0.05 wt. % |
| catalyst | from about 0.005 to about 0.025 wt. % |

| Gamma Oligomer | |
| --- | --- |
| epoxy diacrylate | from about 20 to about 30 wt. % |

| Other Additives | |
| --- | --- |
| first diluent monomer | from about 5 to about 7 wt. % |
| second diluent monomer | from about 20 to about 25 wt. % |
| antioxidant | from about 0.25 to about 1.25 wt. % |
| first photoinitiator | from about 1 to about 4 wt. % |
| second photoinitiator | from about 0.25 to about 0.95 wt. % |
| slip additives (optional) | from about 0.35 to about 0.75 wt. % |

In an alternative embodiment of the oligomer blend in the R coating, the Beta Oligomer, is present, and is a urethane free oligomer obtained by reacting an anhydride with a hydroxyl-containing acrylate.

| Material: | Eq. wt. | # eq. | Wt. | wt. % |
| --- | --- | --- | --- | --- |
| anhydride (HHPA) | 154 | 1.3333 | 205.33 | 27.49 |
| hydroxyl-containing (meth)acrylate (HEA) | 116.12 | 0.6667 | 77.417 | 10.36 |
| epoxy (EPOTEC YD-126) | 183 | 1.3334 | 244.01 | 32.67 |
| polyol (poly(tetrahydrofuran)diol, PTHF 650) | 327.54 | 0.6666 | 218.34 | 29.23 |
| catalyst (triphenylphosphine) | | | 0.93 | 0.12 |
| catalyst (DABCO) | | | 0.28 | 0.04 |
| polymerization inhibitor (BHT) | | | 0.67 | 0.09 |
| total | | | 746.9771 | 100.00 |

The order of addition is as follows: (1) BHT, (2) HHPA; and then (3) PTHF650. After a reaction midpoint is achieved, (4) TPP, (5) DABCO, and (6) Epotec YD-126 are added.

Supercoating

After the Primary Coating and Secondary Coatings are synthesized they are applied to an optical fiber. Persons of ordinary skill in the art know how to manufacture an optical fiber. Application of coatings to optical fibers typically takes place at the location where the optical fiber itself is manufactured.

First the Primary Coating is applied, and with wet on dry processing, the next step is for a source of radiation to be applied to the Primary Coating to cure the Primary Coating. With wet on wet processing the next step is to apply the Secondary Coating.

Either way, after the Primary Coating is applied, then the Secondary Coating is applied on top of the Primary Coating, the radiation is applied and the Secondary Coating is cured.

The radiation used to cure the coatings is any radiation capable of initiating the polymerization reaction. Radiation suitable for curing the coatings is known to include ultraviolet (UV) and electron beam (EB) radiation. The preferred type of radiation to cure the primary and Secondary Coatings of the invention used on optical fiber is UV radiation. This combination of Primary Coating and Secondary Coating is referred to as the Supercoating.

The Supercoating can be successfully applied to the optical fiber at a line speed of between about 750 m/min and about 2,100 m/min.

After the Secondary Coating is cured, a layer of "ink coating" is optionally applied and then the coated and inked optical fiber is placed alongside other coated and inked optical fibers in a "ribbon assembly" and a radiation curable matrix coating is used to hold the optical fibers in the desired location in the ribbon assembly.

Preferably the Supercoating comprises a Primary Coating selected from the group consisting of the CR Primary Coating, the P Primary Coating, the CA Primary Coating and the BJ Primary Coating, and a Secondary Coating selected from the D Secondary Coating and the R Secondary Coating as defined herein.

The Supercoating combination of physical properties of both the Primary and Secondary Coatings on an optical fiber or on a wire used in a Draw Tower Simulator are found to be optimal.

DRAW TOWER SIMULATOR EXAMPLES

In the early years of optical fiber coating developments, all newly developed primary and Secondary Coatings were first tested for their cured film properties and then submitted for evaluation on fiber drawing towers. Out of all the coatings that were requested to be drawn, it was estimated that at most 30% of them were tested on the draw tower due to high cost and scheduling difficulties. The time from when the coating was first formulated to the time of being applied to glass fiber was typically about 6 months, which greatly slowed the product development cycle.

It is known in the art of radiation cured coatings for optical fiber that when either the Primary Coating or the Secondary Coating was applied to glass fiber, its properties often differ from the flat film properties of a cured film of the same coating. This is believed to be because the coating on fiber and the coating flat film have differences in sample size, geometry, UV intensity exposure, acquired UV total exposure, processing speed, temperature of the substrate, curing temperature, and possibly nitrogen inerting conditions.

Equipment that would provide similar curing conditions as those present at fiber manufacturers, in order to enable a more reliable coating development route and faster turnaround time has been developed. This type of alternative application and curing equipment needed to be easy to use, low maintenance, and offer reproducible performance. The name of the equipment is a "draw tower simulator" hereinafter abbreviated "DTS". Draw tower simulators are custom designed and constructed based on detailed examination of actual glass fiber draw tower components. All the measurements (lamp positions, distance between coating stages, gaps between coating stages and UV lamps, etc) are duplicated from glass fiber drawing towers. This helps mimic the processing conditions used in fiber drawing industry.

One known DTS is equipped with five Fusion F600 lamps two for the upper coating stage and three for the lower. The second lamp in each stage can be rotated at various angles between 15-135°, allowing for a more detailed study of the curing profile.

The "core" used for the known DTS is 130.0±1.0 μm stainless steel wire. Fiber drawing applicators of different designs, from different suppliers, are available for evaluation. This configuration allows the application of optical fiber coatings at similar conditions that actually exist at industry production sites.

The draw tower simulator has already been used to expand the analysis of radiation curable coatings on optical fiber, A method of measuring the Primary Coating's in-situ modulus that can be used to indicate the coating's strength, degree of cure, and the fiber's performance under different environments in 2003 was reported by P. A. M. Steeman, J. J. M. Slot, H. G. H. van Melick, A. A. F. v.d. Ven, H. Cao, and R. Johnson, in the Proceedings of the 52nd IWCS, p. 246 (2003). In 2004, Steeman et al reported on how the rheological high shear profile of optical fiber coatings can be used to predict the coatings' processability at faster drawing speeds P. A. M. Steeman, W. Zoetelief, H. Cao, and M. Bulters, Proceedings of the 53rd IWCS, p. 532 (2004). The draw tower simulator can be used to investigate further the properties of primary and Secondary Coatings on an optical fiber.

Test Methods

Percent Reacted Acrylate Unsaturation for the Primary Coating abbreviated as % RAU Primary Test Method:

Degree of cure on the inside Primary Coating on an optical fiber or metal wire is determined by FTIR using a diamond ATR accessory. FTIR instrument parameters include: 100 co-added scans, 4 cm$^{-1}$ resolution, DTGS detector, a spectrum range of 4000-650 cm$^{-1}$, and an approximately 25% reduction in the default mirror velocity to improve signal-to-noise. Two spectra are required; one of the uncured liquid coating that corresponds to the coating on the fiber or wire and one of the inner Primary Coating on the fiber or wire. A thin film of contact cement is smeared on the center area of a 1-inch square piece of 3-mil Mylar film. After the contact cement becomes tacky, a piece of the optical fiber or wire is placed in it. Place the sample under a low power optical microscope. The coatings on the fiber or wire are sliced through to the glass using a sharp scalpel. The coatings are then cut lengthwise down the top side of the fiber or wire for approximately 1 centimeter, making sure that the cut is clean and that the outer coating does not fold into the Primary Coating. Then the coatings are spread open onto the contact cement such that the Primary Coating next to the glass or wire is exposed as a flat film. The glass fiber or wire is broken away in the area where the Primary Coating is exposed.

The spectrum of the liquid coating is obtained after completely covering the diamond surface with the coating. The liquid should be the same batch that is used to coat the fiber or wire if possible, but the minimum requirement is that it must be the same formulation. The final format of the spectrum should be in absorbance. The exposed Primary Coating on the Mylar film is mounted on the center of the diamond with the fiber or wire axis parallel to the direction of the infrared beam. Pressure should be put on the back of the sample to insure good contact with the crystal. The resulting spectrum should not contain any absorbances from the contact cement. If contact cement peaks are observed, a fresh sample should be prepared. It is important to run the spectrum immediately after sample preparation rather than preparing any multiple samples and running spectra when all the sample preparations are complete. The final format of the spectrum should be in absorbance.

For both the liquid and the cured coating, measure the peak area of both the acrylate double bond peak at 810 cm$^{-1}$ and a reference peak in the 750-780 cm$^{-1}$ region. Peak area is determined using the baseline technique where a baseline is chosen to be tangent to absorbance minima on either side of the peak. The area under the peak and above the baseline is then determined. The integration limits for the liquid and the cured sample are not identical but are similar, especially for the reference peak.

The ratio of the acrylate peak area to the reference peak area is determined for both the liquid and the cured sample. Degree of cure, expressed as percent reacted acrylate unsaturation (% RAU), is calculated from the equation below:

$$\% RAU = \frac{(R_L - R_F) \times 100}{R_L}$$

where $R_L$ is the area ratio of the liquid sample and $R_F$ is the area ratio of the cured primary.

% RAU Secondary Test Method: The degree of cure on the outer coating on an optical fiber is determined by FTIR using a diamond ATR accessory. FTIR instrument parameters include: 100 co-added scans, 4 cm$^{-1}$ resolution, DTGS detector, a spectrum range of 4000-650 cm$^{-1}$, and an approximately 25% reduction in the default mirror velocity to improve signal-to-noise. Two spectra are required; one of the uncured liquid coating that corresponds to the coating on the fiber and one of the outer coating on the fiber. The spectrum of the liquid coating is obtained after completely covering the diamond surface with the coating. The liquid should be the same batch that is used to coat the fiber if possible, but the minimum requirement is that it must be the same formulation. The final format of the spectrum should be in absorbance.

The fiber is mounted on the diamond and sufficient pressure is put on the fiber to obtain a spectrum suitable for quantitative analysis. For maximum spectral intensity, the fiber should be placed on the center of the diamond parallel to the direction of the infrared beam. If insufficient intensity is obtained with a single fiber, 2-3 fibers may be placed on the diamond parallel to each other and as close as possible. The final format of the spectrum should be in absorbance.

For both the liquid and the cured coating, measure the peak area of both the acrylate double bond peak at 810 cm$^{-1}$ and a reference peak in the 750-780 cm$^{-1}$ region. Peak area is determined using the baseline technique where a baseline is chosen to be tangent to absorbance minima on either side of the peak. The area under the peak and above the baseline is then determined. The integration limits for the liquid and the cured sample are not identical but are similar, especially for the reference peak.

The ratio of the acrylate peak area to the reference peak area is determined for both the liquid and the cured sample. Degree of cure, expressed as percent reacted acrylate unsaturation (% RAU), is calculated from the equation below:

$$\% RAU = \frac{(R_L - R_F) \times 100}{R_L}$$

where $R_L$ is the area ratio of the liquid sample and $R_F$ is the area ratio of the cured outer coating.

In-situ Modulus of Primary Coating Test Method: The in-situ modulus of a Primary Coating on a dual-coated (soft Primary Coating and hard Secondary Coating) glass fiber or a metal wire fiber is measured by this test method. The detailed discussion on this test can be found in Steeman, P. A. M., Slot, J. J. M., Melick, N. G. H. van, Ven, A. A. F. van de, Cao, H. & Johnson, R. (2003), Mechanical analysis of the in-situ Primary Coating modulus test for optical fibers, in Proceedings 52nd International Wire and Cable Symposium (IWCS, Philadelphia, USA, Nov. 10-13, 2003), Paper 41. For sample preparation, a short length (~2 mm) of coating layer is stripped off using a stripping tool at the location ~2 cm from a fiber end. The fiber is cut to form the other end with 8 mm exactly measured from the stripped coating edge to the fiber end. The portion of the 8 mm coated fiber is then inserted into a metal sample fixture, as schematically shown in FIG. 6 of the paper [1]. The coated fiber is embedded in a micro tube in the fixture; the micro tube consisted of two half cylindrical grooves; its diameter is made to be about the same as the outer diameter (~245 μm) of a standard fiber. The fiber is tightly gripped after the screw is tightened; the gripping force on the Secondary Coating surface is uniform and no significant deformation occurred in the coating layer. The fixture with the fiber is then mounted on a DMA (Dynamic Mechanical Analysis) instrument: Rheometrics Solids Analyzer (RSA-II). The metal fixture is clamped by the bottom grip. The top grip is tightened, pressing on the top portion of the coated fiber to the extent that it crushed the coating layer. The fixture and the fiber must be vertically straight. The non-embedded portion of the fiber should be controlled to a constant length for each sample; 6 mm in our tests. Adjust the strain-offset to set the axial pretension to near zero (−1 g~1 g).

Shear sandwich geometry setting is selected to measure the shear modulus G of the Primary Coating. The sample width, W, of the shear sandwich test is entered to be 0.24 mm calculated according to the following equation:

$$W = \frac{(R_p - R_f)\pi}{\text{Ln}(R_p/R_f)}$$

where $R_f$ and $R_p$ are bare fiber and Primary Coating outer radius respectively. The geometry of a standard fiber, $R_f$=62.5 μm and $R_p$=92.5 μm, is used for the calculation. The sample length of 8 mm (embedded length) and thickness of 0.03 mm (Primary Coating thickness) are entered in the shear sandwich geometry. The tests are conducted at room temperature (~23° C.). The test frequency used is 1.0 radian/second. The shear strain ε is set to be 0.05. A dynamic time sweep is run to obtain 4 data points for measured shear storage modulus G. The reported G is the average of all data points.

This measured shear modulus G is then corrected according to the correction method described in the paper [1]. The correction is to include the glass stretching into consideration in the embedded and the non-embedded parts. In the correction procedures, tensile modulus of the bare fiber ($E_f$) needs to be entered. For glass fibers, $E_f$=70 GPa. For the wire fibers where stainless steel S314 wires are used, $E_f$=120 GPa. The corrected G value is further adjusted by using the actual $R_f$ and $R_p$ values. For glass fibers, fiber geometry including $R_f$ and $R_p$ values is measured by PK2400 Fiber Geometry System. For wire fibers, $R_f$ is 65 μm for the 130 μm diameter stainless steel S314 wires used; $R_p$ is measured under microscope. Finally, the in-situ modulus E (tensile storage modulus) for Primary Coating on fiber is calculated according to E=3G. The reported E is the average of three test samples.

In-situ Modulus of Secondary Coating Test Method: The in-situ modulus of a Secondary Coating on a dual-coated (soft Primary Coating and hard Secondary Coating) glass fiber or a metal wire fiber is measured by this test method. For sample preparation, strip ~2 cm length of the coating layers off the fiber as a complete coating tube from one end of the coated fiber by first dipping the coated fiber end along with the stripping tool in liquid $N_2$ for at least 10 seconds and then strip the coating tube off with a fast motion while the coating layers are still rigid. A DMA (Dynamic Mechanical Analysis) instrument: Rheometrics Solids Analyzer (RSA-II) is used to measure the modulus of the Secondary Coating. For dual-coated fiber, Secondary Coating has much higher modulus than the Primary Coating; therefore the contribution from the Primary Coating on the dynamic tensile test results performed on the coating tube can be ignored. For RSA-II where the distance adjustment between the two grips is limited, the coating tube sample may be shorter than the distance between the two grips. A simple sample holder made by a metal plate folded and tightened at the open end by a screw is used to tightly hold the coating tube sample from the lower end. Slide the fixture into the center of the lower grip and tighten the grip. Using tweezers to straighten the coating tube to upright position through the upper grip. Close and tighten the upper grip. Adjust the strain offset until the pretension is ~10 g.

The tests are conducted at room temperature (~23° C.). Under the dynamic tensile test mode of DMA, the test frequency is set at 1.0 radian/second; the strain is 5E-4. The geometry type is selected as cylindrical. The sample length is the length of the coating tube between the upper edge of the metal fixture and the lower grip, 11 mm in our test. The diameter (D) is entered to be 0.16 mm according to the following equation:

$$D = 2 \times \sqrt{R_s^2 - R_p^2}$$

where $R_s$ and $R_p$ are secondary and Primary Coating outer radius respectively. The geometry of a standard fiber, $R_s$=122.5 μm and $R_p$=92.5 μm, is used for the calculation. A dynamic time sweep is run and 5 data points of tensile storage modulus E are recorded. The reported E is the average of all data points. This measured modulus E is then corrected by multiplying a correction factor which used the actual fiber geometry. The correction factor is $(122.5^2 - 92.5^2)/(R_s^{actual} - R_p^{actual})$. For glass fibers, actual fiber geometry including $R_s$ and $R_p$ values is measured by PK2400 Fiber Geometry System. For wire fibers, $R_s$ and $R_p$ are measured under microscope. The reported E is the average of three test samples.

In-situ $T_g$ Measurement Of Primary and Secondary Coatings Test Method: The glass transition temperatures ($T_g$) of primary and Secondary Coatings on a dual-coated glass fiber or a metal wire fiber are measured by this method. These glass transition temperatures are referred to as "Tube Tg".

For sample preparation, strip ~2 cm length of the coating layers off the fiber as a complete coating tube from one end of the coated fiber by first dipping the coated fiber end along with the stripping tool in liquid $N_2$ for at least 10 seconds and then strip the coating tube off with a fast motion while the coating layers are still rigid.

A DMA (Dynamic Mechanical Analysis) instrument: Rheometrics Solids Analyzer (RSA-II) is used. For RSA-II, the gap between the two grips of RSAII can be expanded as much as 1 mm. The gap is first adjusted to the minimum level by adjusting strain offset. A simple sample holder made by a metal plate folded and tightened at the open end by a screw is used to tightly hold the coating tube sample from the lower end. Slide the fixture into the center of the lower grip and tighten the grip. Using tweezers to straighten the coating tube to upright position through the upper grip. Close and tighten the upper grip. Close the oven and set the oven temperature to a value higher than the $T_g$ for Secondary Coating or 100° C. with liquid nitrogen as temperature control medium. When the oven temperature reached that temperature, the strain offset is adjusted until the pretension was in the range of 0 g to 0.3 g.

Under the dynamic temperature step test of DMA, the test frequency is set at 1.0 radian/second; the strain is 5E-3; the temperature increment is 2° C. and the soak time is 10 seconds. The geometry type is selected as cylindrical. The geometry setting was the same as the one used for secondary in-situ modulus test. The sample length is the length of the coating tube between the upper edge of the metal fixture and the lower grip, 11 mm in our test. The diameter (D) is entered to be 0.16 mm according to the following equation:

$$D = 2 \times \sqrt{R_s^2 - R_p^2}$$

where $R_s$ and $R_p$ are secondary and Primary Coating outer radius respectively. The geometry of a standard fiber, $R_s = 122.5$ μm and $R_p = 92.5$ μm, is used for the calculation.

A dynamic temperature step test is run from the starting temperature (100° C. in our test) till the temperature below the Primary Coating $T_g$ or −80° C. After the run, the peaks from tan δ curve are reported as Primary Coating $T_g$ (corresponding to the lower temperature) and Secondary Coating $T_g$ (corresponding to the higher temperature). Note that the measured glass transition temperatures, especially for primary glass transition temperature, should be considered as relative values of glass transition temperatures for the coating layers on fiber due to the tan δ shift from the complex structure of the coating tube.

Examples 1-3

Three different examples of P Primary Coating are made according to the following formulas:

| P Primary Coating Components | Ex. 1 (wt. %) | Ex. 2 (wt. %) | Ex. 3 (wt. %) |
|---|---|---|---|
| P primary oligomer | 49.50 | 50.0 | 54.00 |
| hydroxyl-containing acrylate (HEA) | 1.41 | 1.61 | 1.54 |
| first isocyanate (TDI) | 1.05 | 1.20 | 1.15 |
| second isocyanate (IPDI) | 4.71 | 4.68 | 5.13 |
| polyether polyol (P2010) | 42.24 | 42.40 | 46.07 |
| catalyst (DBTDL) | 0.03 | 0.03 | 0.03 |
| polymerization inhibitor (BHT) | 0.08 | 0.08 | 0.08 |
| Diluent monomer | 47.00 | 46.40 | 41.90 |
| Primary Coating monomer SR 306 | 1.00 | 0.80 | 1.00 |
| Photoinitiator | 1.10 | 1.40 | 1.70 |
| Antioxidant | 0.50 | 0.50 | 0.50 |
| Adhesion promoter | 0.90 | 0.90 | 0.90 |
| Total | 100.00 | 100.00 | 100.00 |

R Secondary Coating is made according to the following formulas:

| R Secondary Coating Components | wt. % |
|---|---|
| Alpha Oligomer | 49.94 |
| acrylate (HEA) | 4.30 |
| anhydride (HHPA) | 6.86 |
| epoxy (Epotec YD-126 or Epotec YD-128) | 7.91 |
| first catalyst (DABCO) | 0.01 |
| second catalyst (TPP) | 0.03 |
| polymerization inhibitor (BHT) | 0.03 |
| first diluent (isobornyl acrylate, SR-506D) | 6.00 |
| second diluent (tripropylene glycol diacrylate SR-306HP) | 22.98 |
| Beta Oligomer | 24.87 |
| hydroxyl-containing acrylate (HEA) | 4.30 |
| isocyanate (TDI) | 5.12 |
| polypropylene glycol (P1010) | 15.44 |
| catalyst (DBTDL) | 0.01 |
| Gamma Oligomer | 23.00 |
| epoxy diacrylate (CN120Z) | 23.00 |
| Other Additives | 4.52 |
| antioxidant (Irganox 1035) | 0.5 |
| first photoinitiator (Irgacure 184) | 2.76 |
| second photoinitiator (TPO) | 0.76 |
| slip additives (DC-57, DC-190) | 0.5 (0.17 + 0.33) |
| Total | 100.33 |

*0.33 of other ingredients is not present when the optional blend of slip additives is present Draw Tower Simulator Examples Various compositions of the P Primary Coating and the R Secondary Coating, as defined above, are applied to wire using a Draw Tower Simulator. The wire is run at five different line speeds, 750 meters/minute, 1200 meters/minute, 1500 meters/minute, 1800 meters/minute and 2100 meters/minute. Drawing is carried out in wet on dry, meaning the liquid Primary Coating is applied wet, the liquid Primary Coating is cured to a solid layer on the wire. After the Primary Coating is cured, the Secondary Coating is applied and then cured as well.

The properties of the Primary Coating and Secondary Coating are measured and reported for the following tests: % RAU, initial and at one month aging at 85° C./85% RH at uncontrolled light. After the Primary Coating has been cured, then the Secondary Coating is applied.

Draw Tower Simulator Example 1

Multiple runs are conducted with P Primary Coating and the R Secondary Coating. The cured P Primary Coating and the cured R Secondary Coating on the wire are tested for initial % RAU, initial in-situ modulus and initial Tube Tg. The coated wire is then aged for one month at 85° C. and 85% relative humidity. The cured P Primary Coating on the wire and the cured R Secondary Coating on the wire is then aged for one month and tested for % RAU, in-situ modulus and aged Tube Tg.

Set-up Conditions for the Draw Tower Simulator:

Zeidl dies are used. S99 for the 1° and S105 for the 2°.

750, 1000, 1200, 1500, 1800, and 2100 m/min are the speeds.

5 lamps are used in the wet on dry process and 3 lamps are used in the wet on wet process.

(2) 600 W/in² D Fusion UV lamps are used at 100% for the 1° coatings.

(3) 600 W/in² D Fusion UV lamps are used at 100% for the 2° coatings.

Temperatures for the two coatings are 30° C. The dies are also set to 30° C.

Carbon dioxide level is 7 liters/min at each die.

Nitrogen level is 20 liters/min at each lamp.

Pressure for the 1° coating is 1 bar at 25 m/min and goes up to 3 bar at 1000 m/min.

Pressure for the 2° coating is 1 bar at 25 m/min and goes up to 4 bar at 1000 m/min.

The cured radiation curable Primary Coating and cured Secondary Coating on wire is found to have the following properties:

| Line Speed (m/min) | % RAU Primary (Initial) | % RAU Primary (1 month) | % RAU Secondary (Initial) | % RAU Secondary (1 month) |
|---|---|---|---|---|
| 750 | 96 to 99 | 92 to 96 | 90-94 | 94-98 |
| 1200 | 95 to 99 | 92 to 95 | 86-90 | 91-95 |
| 1500 | 88 to 93 | 92 to 96 | 82-86 | 90-94 |
| 1800 | 89 to 93 | 89 to 93 | 83-87 | 89-93 |
| 2100 | 84 to 88 | 88 to 92 | 80-84 | 89-93 |

| Line Speed (m/min) | In-situ Modulus Primary (MPa) | In-situ Modulus Primary (MPa) (1 month) | In-situ Modulus Secondary (GPa) | In-situ Modulus Secondary (GPa) (1 month) |
|---|---|---|---|---|
| 750 | 0.30 to 0.60 | 0.29 to 0.39 | 1.30-1.70 | 1.40-1.90 |
| 1200 | 0.25 to 0.35 | 0.25 to 0.35 | 1.00-1.40 | 1.50-1.70 |
| 1500 | 0.17 to 0.28 | 0.25 to 0.35 | 1.00-1.40 | 1.30-1.70 |
| 1800 | 0.15 to 0.25 | 0.20 to 0.30 | 1.00-1.40 | 1.10-1.50 |
| 2100 | 0.15 to 0.17 | 0.14 to 0.24 | 0.60-1.00 | 1.00-1.40 |

| Line Speed (m/min) | Primary Tube Tg values (° C.) (initial) | Primary Tube Tg values (° C.) (1 month) | Secondary Tube Tg values (° C.) (initial) | Secondary Tube Tg values (° C.) (1 month) |
|---|---|---|---|---|
| 750 | −47 to −52 | −48 to −52 | 68-80 | 68-80 |
| 1200 | −25 to −51 | −48 to −52 | 65-69 | 67-71 |
| 1500 | −49 to −51 | −46 to −50 | 60-64 | 61-65 |
| 1800 | −47 to −51 | −48 to −52 | 61-65 | 61-65 |
| 2100 | −49 to −55 | −48 to −52 | 50-58 | 55-59 |

Using this information it is possible to describe and claim wire coated with a first and second layer, wherein the first layer is a cured radiation curable Primary Coating of the instant claimed invention that is in contact with the outer surface of the wire and the second layer is a cured radiation curable Secondary Coating of the instant claimed invention in contact with the outer surface of the wire, wherein the cured Primary Coating on the wire has the following properties after initial cure and after one month aging at 85° C. and 85% relative humidity:
A) a % RAU of from about 84% to about 99%;
B) an in-situ modulus of between about 0.15 MPa and about 0.60 MPa; and
C) a Tube Tg, of from about −25° C. to about −55° C.; and
wherein the cured Secondary Coating on the wire has the following properties after initial cure and after one month aging at 85° C. and 85% relative humidity:
A) a % RAU of from about 80% to about 98%;
B) an in-situ modulus of between about 0.60 CPa and about 1.90 GPa; and
C) a Tube Tg, of from about 50° C. to about 80° C.

Using this information it is also possible to describe and claim an optical fiber coated with a first and second layer, wherein the first layer is a cured radiation curable Primary Coating of the instant claimed invention that is in contact with the outer surface of the optical fiber and the second layer is a cured radiation curable Secondary Coating of the instant claimed invention in contact with the outer surface of the Primary Coating, wherein the cured Primary Coating on the optical fiber has the following properties after initial cure and after one month aging at 85° C. and 85% relative humidity:
A) a % RAU of from about 84% to about 99%;
B) an in-situ modulus of between about 0.15 MPa and about 0.60 MPa; and
C) a Tube Tg, of from about −25° C. to about −55° C.;
wherein the cured Secondary Coating on the optical fiber has the following properties after initial cure and after one month aging at 85° C. and 85% relative humidity:
A) a % RAU of from about 80% to about 98%;
B) an in-situ modulus of between about 0.60 GPa and about 1.90 Pa; and
C) a Tube Tg, of from about 50° C. to about 80° C.

Draw Tower Simulator Example 2

One of the batches of P Primary Coating and one of the batches of R Secondary Coating are applied to wire using a Draw Tower Simulator. Drawing is carried out using either wet on dry or wet on wet mode. Wet on dry mode means the liquid Primary Coating is applied wet, and then the liquid Primary Coating is cured to a solid layer on the wire. After the Primary Coating is cured, the Secondary Coating is applied and then cured as well. Wet on wet mode means the liquid Primary Coating is applied wet, then the Secondary Coating is applied wet and then both the Primary Coating and Secondary Coatings are cured.

The wire is run at five different line speeds and the properties of the Primary Coating and Secondary Coating are measured and reported for the following tests: % RAU Primary, % RAU Secondary In-situ modulus Primary, In-situ Modulus Secondary and Primary Tube Tg and Secondary Tube Tg. The wire is then aged for one month at 85° C./85% RH with uncontrolled light. The tests previously described are conducted after this one month aging.

Set-Up Conditions for the Draw Tower Simulator:
Zeidl dies are used. S99 for the 1° and S105 for the 2°.
750, 1000, 1200, 1500, 1800, and 2100 m/min are the speeds.
5 lamps are used in the wet on dry process and 3 lamps are used in the wet on wet process.
(2) 600 W/in² D Fusion UV lamps are used at 100% for the 1° coatings.
(3) 600 W/in² D Fusion UV lamps are used at 100% for the 2° coatings.
Temperatures for the two coatings are 30° C. The dies are also set to 30° C.
Carbon dioxide level is 7 liters/min at each die.
Nitrogen level is 20 liters/min at each lamp.
Pressure for the 1° coating is 1 bar at 25 m/min and goes up to 3 bar at 1000 n/m/min.
Pressure for the 2° coating is 1 bar at 25 m/min and goes up to 4 bar at 1000 m/min.

The cured Supercoating, comprising a radiation curable P Primary Coating and a radiation curable R Secondary Coating on wire is found to have the following properties:

| Line Speed (m/sec) | % RAU Primary (Initial) | % RAU Primary (1 month) | % RAU Secondary (Initial) | % RAU Secondary (1 month) |
|---|---|---|---|---|
| 12.5 | 98.4 | 94.3 | 92.7 | 95.9 |
| 20 | 97.5 | 93.8 | 88.4 | 93.5 |

-continued

| Line Speed (m/sec) | % RAU Primary (Initial) | % RAU Primary (1 month) | % RAU Secondary (Initial) | % RAU Secondary (1 month) |
|---|---|---|---|---|
| 25 | 90.7 | 94.7 | 84.7 | 92.5 |
| 30 | 91.2 | 91.6 | 85.9 | 91.6 |
| 35 | 86 | 90.1 | 82 | 91.7 |

| Line Speed (m/sec) | In-situ Modulus Primary (MPa) | In-situ Modulus Primary (MPa) (1 month) | In-situ Modulus Secondary (GPa) | In-situ Modulus Secondary (GPa) (1 month) |
|---|---|---|---|---|
| 12.5 | 0.370 | 0.343 | 1.499 | 1.681 |
| 20 | 0.289 | 0.306 | 1.230 | 1.751 |
| 25 | 0.232 | 0.285 | 1.257 | 1.525 |
| 30 | 0.199 | 0.246 | 1.215 | 1.295 |
| 35 | 0.162 | 0.171 | 0.871 | 1.292 |

| Line Speed (m/sec) | Primary Tube Tg values (° C.) (initial) | Primary Tube Tg values (° C.) (1 month) | Secondary Tube Tg values (° C.) (initial) | Secondary Tube Tg values (° C.) (1 month) |
|---|---|---|---|---|
| 12.5 | −49.9 | −50.5 | 70.7 | 70.8 |
| 20 | −49.6 | −50.6 | 67.5 | 69 |
| 25 | −51.7 | −48.5 | 62.6 | 63.3 |
| 30 | −49.6 | −50.4 | 63.4 | 63.1 |
| 35 | −51.5 | −50.5 | 56.1 | 57.2 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A Supercoating suitable for coating an optical fiber;
wherein the Supercoating comprises at least two layers, wherein the first layer is a Primary Coating that is in contact with the outer surface of the optical fiber and the second layer is a Secondary Coating in contact with the outer surface of the Primary Coating,
wherein when the Primary Coating and Secondary Coating are applied to the Optical Fiber being drawn at a line speed of from about 750 m/min to about 2100 m/min the cured Primary Coating on the optical fiber has the following properties after initial cure and after one month aging at 85° C. and 85% relative humidity:
a % RAU of from 84% to 99%;
an in-situ modulus of between 0.15 MPa and 0.60 MPa; and
a Tube Tg, of from −25° C. to −55° C.;
and the cured Secondary Coating on the optical fiber has the following properties after initial cure and after one month aging at 85° C. and 85% relative humidity:
a % RAU of from 80% to 98%;
an in-situ modulus of between 0.60 GPa and 1.90 GPa; and
a Tube Tg, of from 50° C. to 80° C.,
wherein the cured Primary Coating is cured from a composition comprising
about 40 wt. % to about 70 wt. % of a first oligomer;
about 35 wt. % to about 45 wt. % of a first diluent monomer;
about 1.00 wt. % to about 2.00 wt. % of a first photoinitiator;
about 0.25 wt. % to about 0.75 wt. % of a first antioxidant; and
about 0.8 wt. % to about 1.0 wt. % of a first adhesion promoter;
wherein said first oligomer is the reaction product of:
about 1 wt. % to about 3 wt. % of a first hydroxyethyl (meth)acrylate;
about 1 wt. % to about 2 wt. % of a first aromatic isocyanate;
about 4 wt. % to about 6 wt. % of a first aliphatic isocyanate;
about 40 wt. % to about 60 wt. % of a first polyether polyol selected from the group consisting of polyethylene glycol and polypropylene glycol;
about 0.1 wt. % to about 0.05 wt. % of a first catalyst; and
about 0.05 wt. % to about 0.10 wt. % of a first polymerization inhibitor;
wherein said first catalyst is selected from the group consisting of dibutyl in dilaurate; organobismuth catalysts; metal carboxylates, sulfonic acids, amino or organobase catalysts, alkoxides of zirconium and titanium, and ionic liquid phosphonium, imidazolium, and pyridinium salts;
wherein said first oligomer is the only oligomer present in the Primary Coating composition, and wherein said first oligomer has a number average molecular weight of from about 5,000 g/mol to less than or equal to about 10,000 g/mol;

wherein the cured Secondary Coating is cured from a composition comprising
- a Secondary Coating Oligomer Blend, which is mixed with
  - about 5 wt. % to about 7 wt. % of a second diluent monomer;
  - about 20 wt. % to about 25 wt. % of a third diluent monomer;
  - about 0.25 wt. % to about 1.25 wt. % of a second antioxidant;
  - about 1 wt. % to about 4 wt. % of a second photoinitiator; and
  - about 0.25 wt. % to about 0.95 wt. % of a third photoinitiator; and
  - optionally about 0.37 wt. % to about 0.75 wt. % of slip additives to form the Secondary Coating;

wherein said Secondary Coating Oligomer Blend comprises:
- an Alpha Oligomer;
- a Beta Oligomer; and
- a Gamma Oligomer;

wherein said Alpha Oligomer is synthesized by the reaction of
- about 5 wt. % to about 7 wt. % of an anhydride with
- about 3 wt. % to about 5 wt. % of a hydroxyl group containing acrylate;

and the reaction product of said anhydride and said hydroxyl group containing acrylate is then reacted further with
- about 5 wt. % to about 9 wt. % of an epoxy; in the presence of
  - about 0.005 wt. % to about 0.25 wt. % of a second catalyst;
  - about 0.01 wt. % to about 0.05 wt. % of a third catalyst; and
  - about 0.01 wt. % to about 0.05 wt. % of a second polymerization inhibitor;
- to yield the Alpha Oligomer;

wherein said Beta Oligomer is synthesized by the reaction of
- about 3 wt. % to about 5 wt. % of a hydroxyl group containing acrylate;
- about 4 wt. % to about 6 wt. % of a diisocyanate; and
- about 13 wt. % to about 17 wt. % of a polyether polyol; in the presence of
- about 0.005 wt. % to about 0.025 wt. % of a fourth catalyst;

wherein said fourth catalyst is selected from the group consisting of copper naphthenate, cobalt naphthenate, zinc naphthenate, triethylamine, triethylenediamine, 2 methyltriethyleneamine, dibutyl in dilaurate, metal carboxylates, sulfonic acids, amino-base catalysts, organo-base catalysts, alkoxides of zirconium, alkoxides of titanium, ionic liquid phosphonium salts, ionic liquid imidazolium salts and ionic liquid pyridinium salts; and wherein said Gamma Oligomer is an epoxy diacrylate and is present in an amount of about 20 to about 30 wt. %.

2. A Supercoating suitable for coating optical fiber wherein the Supercoating comprises at least two layers, wherein the first layer is a Primary Coating that is in contact with the outer surface of the optical fiber and the second layer is a Secondary Coating in contact with the outer surface of the Primary Coating, wherein when the Primary Coating and Secondary Coating are applied to the Optical Fiber being drawn at a line speed of from about 750 m/min to about 2100 m/min the cured Primary Coating on the optical fiber has the following properties after initial cure and after one month aging at 85° C. and 85% relative humidity:
- a % RAU of from 84% to 99%;
- an in-situ modulus of between 0.15 MPa and 0.60 MPa; and
- a Tube Tg, of from −25° C. to −55° C.; and wherein the cured Secondary Coating on the optical fiber has the following properties after initial cure and after one month aging at 85° C. and 85% relative humidity:
- a % RAU of from 80% to 98%;
- an in-situ modulus of between 0.60 GPa and 1.90 GPa; and
- a Tube Tg, of from 50° C. to 80° C., wherein the cured Primary Coating is cured from a composition comprising
- about 40 wt. % to about 70 wt. % of a first oligomer;
- about 35 wt. % to about 45 wt. % of a first diluent monomer;
- about 1.00 wt. % to about 2.00 wt. % of a first photoinitiator;
- about 0.25 wt. % to about 0.75 wt. % of a first antioxidant; and
- about 0.8 wt. % to about 1.0 wt. % of a first adhesion promoter;

wherein said first oligomer is the reaction product of:
- about 1 wt. % to about 3 wt. % of a first hydroxyethyl acrylate;
- about 1 wt. % to about 2 wt. % of a first aromatic isocyanate;
- about 4 wt. % to about 6 wt. % of a first aliphatic isocyanate;
- about 40 wt. % to about 60 wt. % of a first polyol;
- about 0.01 wt. % to about 0.05 wt. % of a first catalyst; and
- about 0.05 wt. % to about 0.10 wt. % of a first polymerization inhibitor;

wherein said first catalyst is selected from the group consisting of dibutyl in dilaurate; metal carboxylates, sulfonic acids, amino or organo-base catalysts, alkoxides of zirconium and titanium, and ionic liquid phosphonium, imidazolium, and pyridinium salts;

wherein said first oligomer is the only oligomer present in the Primary Coating composition, and wherein said first oligomer has a number average molecular weight of from about 5000 g/mol to less than or equal to about 10,000 g/mol;

wherein the cured Secondary Coating is cured from a composition comprising
- a Secondary Coating Oligomer blend, which is mixed with
  - about 4 wt. % to about 7 wt. % of a second diluent monomer;
  - about 15 wt. % to about 25 wt. % of a third diluent monomer;
  - about 13 wt. % to about 19 wt. % of a fourth diluent monomer;
  - about 1.75 wt. % to about 3.75 wt. % of a second photoinitiator;
  - about 0.5 wt. % to about 1 wt. % of a third photoinitiator;

about 0.3 wt. % to about 0.7 wt. % of a second antioxidant; and
optionally about 0.35 wt. % to about 0.75 wt. % of slip additives to form the Secondary Coating
wherein said Secondary Coating Oligomer Blend comprises
an Omega Oligomer;
an Upsilon Oligomer;
wherein said Omega Oligomer is prepared by reaction of
about 5 wt. % to about 7 wt. % of a hydroxyl-containing meth(acrylate);
about 7 wt. % to about 9 wt. % of an isocyanate;
about 15 wt. % to about 18 wt. % of a polyether polyol; and
about 0.3 wt. % to about 0.6 wt. % of a tripropylene glycol
in the presence of
about 0.01 wt. % to about 0.03 wt. % of a polymerization inhibitor; and
about 0.06 wt. % to about 0.1 wt. % of a catalyst;
wherein said Upsilon Oligomer is an epoxy diacrylate and is present in an amount of about 20 to about 30 wt. %.

* * * * *

UNITED STATES PATENT AND TRADEMARK OFFICE
CERTIFICATE OF CORRECTION

| | | |
|---|---|---|
| PATENT NO. | : 8,426,020 B2 | Page 1 of 4 |
| APPLICATION NO. | : 11/955541 | |
| DATED | : April 23, 2013 | |
| INVENTOR(S) | : Schmid et al. | |

It is certified that error appears in the above-identified patent and that said Letters Patent is hereby corrected as shown below:

ON THE TITLE PAGE:

Please make the following corrections:

Item (57) Abstract section, line 8, change 85°C. to -- 85°C --.

Item (57) Abstract section, line 13, change -25°C. to -- -25°C -- and change -55°C. to -- -55°C --.

Item (57) Abstract section, line 16, change 85°C. to -- 85°C --.

Item (57) Abstract section, line 20, change 50°C. to -- 50°C --.

IN THE SPECIFICATION:

Column 1, line 52, change sorter to -- softer --.

Column 2, line 38, change (PECDA) to -- (PEGDA) --.

Column 4, line 20, change all to -- an --.

Column 4, line 57, change 85°C. to -- 85°C --.

Column 4, line 61, change -25°C. to -- -25°C -- and change -55°C.; to -- -55°C; --.

Column 4, line 64, change 85°C. to -- 85°C --.

Column 5, line 1, change 50°C. to -- 50°C --.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,426,020 B2

Column 5, line 13, change 85°C. to -- 85°C --.

Column 5, line 17,
change -25°C. to -- -25°C -- and
change -55°C. to -- -55°C --.

Column 5, line 20, change 85°C. to -- 85°C --.

Column 5, line 64, change 50°C. to -- 50°C --.

Column 9, lines 13-14,
change triethylenle to -- triethylene --.

Column 10, line 6, change phenols to -- phenol, --.

Column 11, line 45, change aliphataic to -- aliphatic --.

Column 13, line 34,
change (Chivacure 184 to -- (Chivacure 184) --.

Column 15, line 45, change 746.9771 to -- 746.977 --.

Column 19, line 41, change (~23°C.). to -- (~23°C) --.

Column 20, line 18, change (~23°C.). to -- (~23°C) --.

Column 20, line 38, change Geolnetry to -- Geometry --.

Column 20, line 46, change lengtli to -- length --.

Column 20, line 63, change 100°C. to -- 100°C --.

Column 21, line 3, change 2°C. to -- 2°C --.

Column 21, line 17, change 100°C. to -- 100°C --.

Column 22, line 30, change 85°C./85% to -- 85°C/85% --.

Column 22, line 38, change 85°C. to -- 85°C --.

Column 23, Table 3, line 33,
change (°C.) to -- (°C) --,
change (°C.) to -- (°C) --,
change (°C.) to -- (°C) --, and
change (°C.) to -- (°C) --.

CERTIFICATE OF CORRECTION (continued)

U.S. Pat. No. 8,426,020 B2

Column 23, line 51, change 85°C. to -- 85°C --.

Column 23, line 55,
change -25°C. to -- -25°C -- and
change -55°C. to -- -55°C --.

Column 23, line 58, change 85°C. to -- 85°C --.

Column 23, line 62, change 50°C. to -- 50°C --.

Column 24, line 6, change 85°C. to -- 85°C --.

Column 24, line 10,
change -25°C. to -- -25°C -- and
change -55°C. to -- -55°C --.

Column 24, line 13, change 85°C. to -- 85°C --.

Column 24, line 17, change 50°C. to -- 50°C --.

Column 24, line 35, change 85°C./85% to -- 85°C/85% --.

Column 24, line 53,
change 1000 n/m/min. to -- 1000 m/min. --.

Column 25, Table 3, line 27,
change (°C.) to -- (°C) --,
change (°C.) to -- (°C) --,
change (°C.) to -- (°C) --, and
change (°C.) to -- (°C) --.

IN THE CLAIMS:

Column 26, Claim 1, line 24, change 85°C. to -- 85°C --.

Column 26, Claim 1, line 28,
change -25°C. to -- -25°C -- and
change -55°C. to -- -55°C --.

Column 26, Claim 1, line 31, change 85°C. to -- 85°C --.

Column 26, Claim 1, line 35,
change 50°C. to -- 50°C -- and
change 80°C. to -- 80°C --.

CERTIFICATE OF CORRECTION (continued)
U.S. Pat. No. 8,426,020 B2

Column 26, Claim 1, line 57, change 0.1 to -- 0.01 --.

Column 26, Claim 1, line 61, change in to -- tin --.

Column 27, Claim 1, line 56, change in to -- tin --.

Column 28, Claim 2, line 9, change 85°C. to -- 85°C --.

Column 28, Claim 2, line 13,
change -25°C. to -- -25°C -- and
change -55°C. to -- -55°C --.

Column 28, Claim 2, line 16, change 85°C. to -- 85°C --.

Column 28, Claim 2, line 20,
change 50°C. to -- 50°C -- and
change 80°C. to -- 80°C --.

Column 28, Claim 2, line 45, change in to -- tin --.